(12) United States Patent
Iguchi et al.

(10) Patent No.: US 7,586,517 B2
(45) Date of Patent: Sep. 8, 2009

(54) IMAGE PICKUP APPARATUS

(75) Inventors: Masayasu Iguchi, Nishinomiya (JP); Satoshi Kondo, Yawata (JP); Takahiro Nishi, Ikoma (JP); Toshiyasu Sugio, Osaka (JP); Tadamasa Toma, Toyonaka (JP); Hisao Sasai, Suita (JP)

(73) Assignee: Panasonic Corporation, Osaka (JP)

( * ) Notice: Subject to any disclaimer, the term of this patent is extended or adjusted under 35 U.S.C. 154(b) by 674 days.

(21) Appl. No.: 11/259,208

(22) Filed: Oct. 27, 2005

(65) Prior Publication Data
US 2006/0088297 A1 Apr. 27, 2006

(30) Foreign Application Priority Data
Oct. 27, 2004 (JP) ............... 2004-312942

(51) Int. Cl.
H04N 5/225 (2006.01)
H04N 5/00 (2006.01)
G06K 9/00 (2006.01)

(52) U.S. Cl. ............... 348/207.1; 386/117; 382/118

(58) Field of Classification Search ............ 348/207.1, 348/207.11; 358/906; 386/52, 55, 95, 117, 386/125; 725/115, 145
See application file for complete search history.

(56) References Cited

U.S. PATENT DOCUMENTS

| | | | | |
|---|---|---|---|---|
| 5,774,624 A * | 6/1998 | Enari | .................... | 386/111 |
| 6,057,893 A * | 5/2000 | Kojima et al. | ............... | 348/700 |
| 6,334,021 B1 * | 12/2001 | Nagasawa | .................... | 386/45 |
| 6,587,637 B2 * | 7/2003 | Nagasaka et al. | ............. | 386/69 |
| 6,836,289 B2 * | 12/2004 | Koshiba et al. | ............. | 348/273 |
| 7,233,684 B2 * | 6/2007 | Fedorovskaya et al. | ..... | 382/118 |
| 2004/0101212 A1 | 5/2004 | Fedorovskaya et al. | | |
| 2004/0244047 A1 * | 12/2004 | Shinkai et al. | ............. | 725/115 |

FOREIGN PATENT DOCUMENTS

| | | |
|---|---|---|
| EP | 1 422 639 | 5/2004 |
| JP | 2003-299010 | 10/2003 |
| JP | 2004-178593 | 6/2004 |

* cited by examiner

*Primary Examiner*—Lin Ye
*Assistant Examiner*—Trung Diep
(74) *Attorney, Agent, or Firm*—Wenderoth, Lind & Ponack, L.L.P.

(57) ABSTRACT

An image pickup apparatus includes an image processing unit for extracting an image parameter indicating a change in shooting condition from an image signal obtained by shooting an object; an audio processing unit for extracting an audio parameter indicating a change in shooting condition from an audio signal obtained by taking audio; and a specific ID information processing unit for extracting a state parameter indicating a change in shooting condition on the basis of information indicating a physiological change of an operator; and the extracted parameter is compared with a predetermined decision threshold to determine whether a shoot timing at which is parameter occurs is appropriate as an edition point or not.

20 Claims, 15 Drawing Sheets

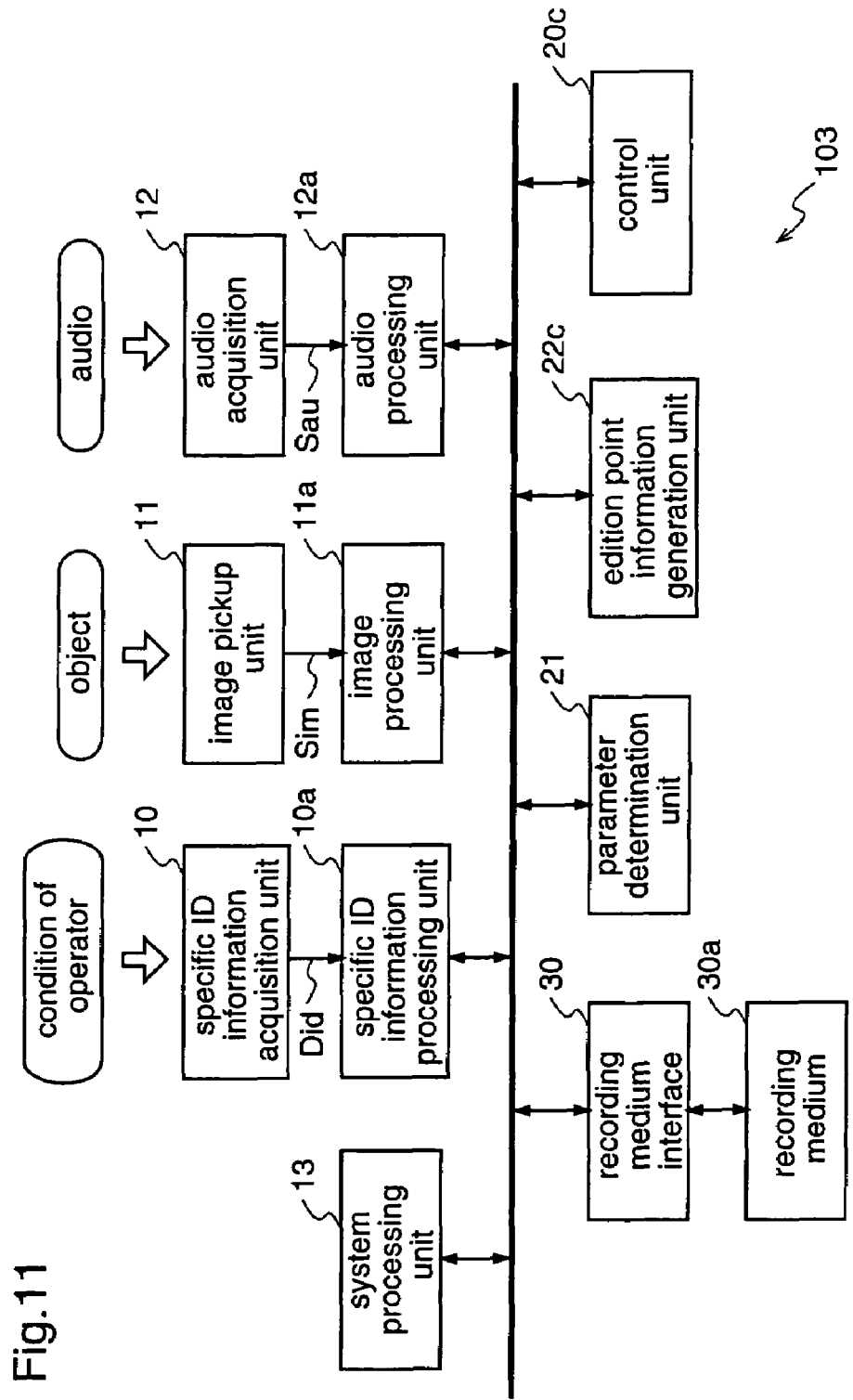

original reference relationship (display sequence)

IMAGE PICKUP APPARATUS

FIELD OF THE INVENTION

The present invention relates to an image pickup apparatus and, more particularly, to a data processing for setting an edition point on audio visual (AV) data that is obtained by shooting using the image pickup apparatus.

BACKGROUND OF THE INVENTION

In recent years, a digital image pickup apparatus for shooting an object, coding digital video data, and recording the coded digital video data on a recording medium has become widespread, resulting in an increase in chances of handling a large quantity of digital video data at home.

Although it is desired to edit and organize once shot video, it is troublesome to search the video for a start point of edition. For example, although video data which have been taken in an athletic meeting or a wedding ceremony are temporarily recorded on a recording medium, the video might be left as it is without being reviewed because edition thereof is troublesome.

Further, even when a start point of edition is detected, since a picture corresponding to this start point is an inter-frame predictive picture in a predictive coding process, the start point cannot be easily used as a start position.

As described above, video data taken by the conventional image pickup apparatus needs a troublesome edition working to view only an important part of the video or store it in a recording medium.

Meanwhile, Japanese Published Patent Application No. 2003-299010 discloses a video contents edition support system, and this system includes an image pickup apparatus for shooting an image and recording video contents data, and an editor terminal apparatus for receiving the video contents data obtained by the shooting with the image pickup apparatus through a network or the like in real time to display the image.

The image pickup apparatus of this edition support system includes an electronic mark generation unit for generating electronic mark data on the basis of user operation or the like, and an electronic mark insertion unit for inserting the generated electronic mark data in the video contents data obtained by shooting in association with time codes thereof. Further, the editor terminal apparatus of the edition support system includes a list formation unit for forming electronic mark list data on the basis of the electronic mark data from the image pickup apparatus, and a display unit for displaying the video contents data supplied from the image pickup apparatus, and an image of the video contents data synchronized with the timing corresponding to the electronic mark data is displayed on the display unit.

In the conventional video contents edition support system, since the electronic mark data is added to the video contents data which is data obtained by shooting an object by user operation during shooting, the video contents data obtained by the shooting can be automatically edited on the basis of the electronic mark data by the editor terminal apparatus such as a personal computer.

In the video contents edition support system disclosed in Japanese Published Patent Application No. 2003-299010, however, it is necessary to add the electronic mark data indicating an edition position to the video contents data during edition in order to realize automatic edition after shooting, leading to a troublesome operation of adding markers to important shot parts which seem to be edited and left, during shooting.

SUMMARY OF THE INVENTION

The present invention is made to solve the above-mentioned problems and has for its object to provide an image pickup apparatus which is able to edit a shot part that seems to be important for an operator, automatically or by a simple selecting operation according to a guidance.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image pickup apparatus for obtaining image information and audio information by shooting an object, and recording an AV stream including the image information and the audio information, comprising: an image pickup unit for shooting an object to output an image signal; an image processing unit for subjecting the image signal obtained by shooting the object to signal processing, and extracting image information including an image parameter that indicates a feature of a change in the image; an audio acquisition unit for taking audio to output an audio signal; an audio processing unit for subjecting the audio signal obtained by taking the audio to signal processing, and extracting audio information including an audio parameter that indicates a feature of a change in the audio; a parameter determination unit for checking the image parameter or the audio parameter to determine whether a shoot timing at which the image or the audio changes is appropriate as an edition point or not; and an information generation unit for generating edition point information indicating a shoot timing which is determined to be appropriate as an edition point; wherein an audio video stream including the image information, the audio information, and the edition point information is stored in a recording medium. Therefore, a part of the AV stream obtained by shooting, which seems to be important for the operator, can be edited automatically or by a simple selecting operation according to a guidance.

According to a second aspect of the present invention, the image pickup apparatus according to the first aspect further includes a specific ID information acquisition unit for obtaining specific ID information indicating a shooting condition; and a specific ID information processing unit for subjecting the obtained specific ID information to signal processing, and extracting a specific parameter that indicates a feature of a change in the shooting condition; wherein the parameter determination unit checks the specific parameter as well as the image parameter or the audio parameter to determine whether a shoot timing at which the image, audio, or shooting condition changes is appropriate as an edition point or not. Therefore, a shoot timing at which the shooting condition changes significantly can be set as an edition point.

According to a third aspect of the present invention, in the image pickup apparatus according to the second aspect, the specific parameter shows the magnitude of a physiological change of an operator that occurs during shooting, or the magnitude of adjustment by operation of the operator. Therefore, a shoot timing at which the operator unconsciously operates the image pickup apparatus or a shoot timing at which the operator concentrates or gets excited can be set as an edition point.

According to a fourth aspect of the present invention, in the image pickup apparatus according to the third aspect, the physiological change of the operator that occurs during shooting is at least one of a change in perspiration of the operator, a change in α wave, a change in the number of blinks, a change in pupil, and a change in pulse; and the specific ID information acquisition unit includes a sensor according to the type of the physiological change, for measuring the physiological change of the operator. Therefore, a scene that is important for the operator can be edited on the basis of the physiological change of the operator.

According to a fifth aspect of the present invention, in the image pickup apparatus according to the first aspect, the image processing unit subjects the image signal obtained by shooting the object to an inter-frame predictive coding process for predictively coding a target picture to be coded, with reference to an already coded picture, and extracts the image parameter on the basis of a motion vector indicating the magnitude of motion of the image, which vector is used in the inter-frame predictive coding process; the audio processing unit subjects the audio signal obtained by taking the audio to a coding process corresponding to the coding process for the image signal; and the information generation unit sets a specific picture included in an image stream obtained by coding the image signal, at the edition point, on the basis of the shoot timing that is determined to be appropriate as an edition point. Therefore, the image parameter relating to the motion of the image can be accurately extracted on the basis of the motion vector to be used in the predictive coding process.

According to a sixth aspect of the present invention, in the image pickup apparatus according to the first aspect, the audio processing unit extracts the audio parameter on the basis of the magnitude of a change in the audio signal. Therefore, the audio parameter relating to the loudness of the audio can be accurately extracted on the basis of the audio signal.

According to a seventh aspect of the present invention, the image pickup apparatus according to the second aspect further includes a control unit for setting threshold levels for the image parameter or the audio parameter, and the specific parameter, respectively, on the basis of a user's manual operation signal; wherein the parameter determination unit checks the respective parameters on the basis of the corresponding threshold levels which are set by the control unit to determine whether a shoot timing at which the image, audio, or shooting condition changes is appropriate as an edition point or not. Therefore, the user can set the threshold levels for the image parameter or the audio parameter and the specific parameter, whereby user's preference or the like can be reflected to the automatic edition of the shot image data.

According to an eighth aspect of the present invention, the image pickup apparatus according to the second aspect further includes a control unit having table information indicating correspondence between each one of plural scenarios, and combination of the threshold levels for the image parameter or the audio parameter and the specific parameter, and setting the threshold levels of the respective parameters on the basis of a scenario designated by user's manual operation, and the table information; wherein the parameter determination unit checks the respective parameters on the basis of the corresponding threshold levels which are set by the control unit to determine whether a shoot timing at which the image, audio, or shooting condition changes is appropriate as an edition point or not. Therefore, automatic edition is realized according to the location where shooting was carried out, such as athletic meeting or wedding ceremony, by a simple operation such as selecting a scenario adapted to the location.

According to a ninth aspect of the present invention, in the image pickup apparatus according to the eighth aspect, the table information is downloaded from an information terminal on a network. Therefore, an appropriate decision threshold adapted to a scenario, which is used for determining whether a shoot timing at which the image, audio, or shooting condition changes is appropriate to be an edition point or not, can be set for each parameter that is a change in the image, audio, or shooting condition, by utilizing such as a homepage of a maker of the image pickup apparatus.

According to a tenth aspect of the present invention, in the image pickup apparatus according to the first aspect, the information generation unit sets a picture to be used as an edition point, to a head picture of a VOB unit as a unit of random access, which is closest to a shoot timing at which the image or audio changes, in an image stream obtained by coding the image signal. Therefore, even in the state where the image signal obtained by shooting is coded, setting of an edition point can be carried out without processing the coded data.

According to an eleventh aspect of the present invention, in the image pickup apparatus according to the tenth aspect, the information generation unit sets the edition point to a shoot timing according to a delay time from when an event that changes the image or audio occurs to when the image or audio actually changes. Therefore, an edition point can be set at a timing when an event actually occurs.

According to a twelfth aspect of the present invention, in the image pickup apparatus according to the first aspect, the image processing unit performs, according to an instruction from the information generation unit, Trans-coding on the image stream obtained by coding the image signal so that the picture corresponding to the edition point becomes an I picture position at the beginning of a VOB unit. Therefore, even in the state where the image signal obtained by shooting is coded, setting of an edition point can be carried out accurately without processing the coded data.

According to a thirteenth aspect of the present invention, in the image pickup apparatus according to the twelfth aspect, the information generation unit sets the edition point to a shoot timing according to a delay time from when an event that changes the image or audio occurs to when the image or audio actually changes. Therefore, an edition point can be set approximately at a timing when an even actually occurs.

According to a fourteenth aspect of the present invention, in the image pickup apparatus according to the first aspect, the information generation unit checks whether buffer data as image information before coding are stored in the image processing unit or not, sets the edition point to a picture corresponding to a shoot timing at which the image, audio, or shooting condition changes, when the buffer data before coding are stored, and sets the edition point to a head picture of a VOB unit as a unit of random access, which is closest to a shoot timing at which the image or audio changes, in a stream obtained by coding the image signal with the image processing unit, when the buffer data before coding are not stored; and the image processing unit generates a VOB unit so that the picture corresponding to the edition point becomes a head picture of the VOB unit, when buffer data before coding are stored in the image processing unit. Therefore, an edition point can be accurately set when there are buffer data before coding, and an edition point can be easily set when there are no buffer data before coding.

According to a fifteenth aspect of the present invention, in the image pickup apparatus according to the first aspect, the information generation unit checks whether buffer data as image information before coding are stored in the image processing unit or not, sets the edition point to a picture corresponding to a shoot timing at which the image, audio, or shooting condition changes, when the buffer data before coding are stored, compares the remaining time which can be used for coding in the image processing unit with the time required for Trans-coding, when buffer data before coding are not stored, sets the edition point to a head picture of a VOB unit as a unit of random access, which is closest to a shoot timing at which the image or audio changes, in an image stream obtained by coding the image signal with the image processing unit, when the time required for Trans-coding exceeds the remaining time which can be used for coding in the image processing unit, and instructs the image processing unit to perform Trans-coding of the image stream, when the time required for Trans-coding does not exceed the remaining time which can be used for coding in the image processing unit; and the image processing unit generates a VOB unit so that the picture corresponding to the edition point becomes a head picture of the VOB unit, when buffer data before coding are stored, and performs Trans-coding on the image stream obtained by coding the image signal so that the picture corresponding to the edition point becomes an I picture positioned at the beginning of a VOB unit, when buffer data before coding are not stored and the time required for Trans-coding does not exceed the remaining time which can be used for coding in the image processing unit. Therefore when there are buffer data before coding or even when there are no buffer data before coding, an edition point can be set accurately so long as the time required for Trans-coding does not exceed the remaining time that can be used for coding. When there are no buffer data before coding and the time required for Trans-coding exceeds the remaining time that can be used for coding, an edition point can be easily set.

According to a sixteenth aspect of the present invention, in the image pickup apparatus according to the first aspect, the time at which an even that changes the image or audio occurs is recorded as the edition point in the audio video stream. Therefore, an edition point can be set very easily.

According to a seventeenth aspect of the present invention, in the image pickup apparatus according to the sixteenth aspect, the time at which the event occurs is recorded as a play list indicating playback conditions in the AV stream. Therefore, an edition point can be set very easily.

According to an eighteenth aspect of the present invention, in the image pickup apparatus according to the sixteenth aspect, information indicating which factor, image or audio, causes the edition point is embedded in the AV stream. Therefore, when edition is carried out, edition points can be thinned according to which factor causes an edition point.

According to a nineteenth aspect of the present invention, in the image pickup apparatus according to the first aspect, the information generation unit embeds a picture corresponding to the time at which an event that changes the image or audio occurs, as an out-of-sequence picture to be used for thumbnail display during edition, in the AV stream. Therefore, when edition is carried out, a picture appropriate for an edition point can be recognized at a glance by the thumbnail display.

According to a twentieth aspect of the present invention, there is provided an image pickup apparatus for obtaining image information and audio information by shooting an object, and recording an AV stream including the image information and the audio information, comprising: an image pickup unit for shooting an object to output an image signal; an image processing unit for subjecting the image signal obtained by shooting the object to signal processing, and extracting image information including an image parameter that indicates a feature of a change in the image; an audio acquisition unit for taking audio to output an audio signal; an audio processing unit for subjecting the audio signal obtained by taking the audio to signal processing, and extracting audio information including an audio parameter that indicates a feature of a change in the audio; an information generation unit for generating edition point information indicating, as an edition point, a shoot timing at which the image or audio changes; a recording unit for storing an audio video stream including the image information, the audio information, and the edition point information into a recording medium; and a parameter determination unit for checking the image parameter for checking the image parameter or the audio parameter to determine whether a shoot timing which is indicated as an edition point by the edition point information is to be used for edition or not, when editing the audio video stream. Therefore, during generation of the AV stream, determination as to whether the even occurrence timing is to be set as an edition point or not is dispensed with.

According to a twenty-first aspect of the present invention, there is provided an image pickup method for obtaining image information and audio information by shooting an object, and recording an AV stream including the image information and the audio information, comprising: an image pickup step of shooting an object to output an image signal; an image processing step of subjecting the image signal obtained by shooting the object to signal processing, and extracting image information including an image parameter that indicates a feature of a change in the image; an audio acquisition step of taking audio to output an audio signal; an audio processing step of subjecting the audio signal obtained by taking the audio to signal processing, and extracting audio information including an audio parameter that indicates a feature of a change in the audio; a parameter determination step of checking the image parameter or the audio parameter to determine whether a shoot timing at which the image or the audio changes is appropriate as an edition point or not; an information generation step of generating edition point information indicating a shoot timing which is determined to be appropriate as an edition point; and a step of storing an audio video stream including the image information, the audio information, and the edition point information into a recording medium. Therefore, a part of the AV stream, which seems to be important for the operator, can be edited automatically or by a simple selecting operation according to a guidance.

According to a twenty-second aspect of the present invention, there is provided a semiconductor device for obtaining image information and audio information by shooting an object, and recording an AV stream including the image information and the audio information, comprising: an image processing unit for subjecting an image signal obtained by shooting an object to signal processing, and extracting image information including an image parameter that indicates a feature of a change in the image; an audio acquisition unit for taking audio to output an audio signal; an audio processing unit for subjecting the audio signal obtained by taking the audio to signal processing, and extracting audio information including an audio parameter that indicates a feature of a change in the audio; a parameter determination unit for checking the image parameter or the audio parameter to determine whether a shoot timing at which the image or audio changes is appropriate as an edition point or not; and an information generation unit for generating edition point information indicating a shoot timing which is determined to be appropriate as an edition point; wherein an audio video stream including the image information, the audio information, and the edition point information is stored in a recording medium. Therefore, it is possible to provide a semiconductor device which can make a stream that is editable automatically or by a simple selecting operation according to a guidance, which stream corresponds to a part of the AV stream obtained by shooting, which part seems to be important for the operation.

BRIEF DESCRIPTION OF THE DRAWINGS

FIGS. 5(a) and 5(b) are diagrams for specifically explaining an edition point setting process by the image pickup apparatus according to the first embodiment, wherein FIG. 5(a) shows the process flow, and FIG. 5(b) shows the relationship between a shoot timing and a gap between VOB units in the AV stream.

FIGS. 10(a) to 10(d) are diagrams for explaining a Transcoding process of compulsorily forming a VOB unit VOBU in the image pickup apparatus according to the second embodiment, wherein FIG. 10(a) shows the normal reference relationship during coding, and FIGS. 10(b) to 10(d) show three modifications of the picture type and the reference relationship by the Trans-coding.

FIG. 11 is a diagram for explaining an image pickup apparatus according to a third embodiment of the present invention.

FIGS. 13(a) to 13(d) are diagrams for explaining a process of fabricating a new VOB unit VOBU in the image pickup apparatus according to the third embodiment, wherein FIG. 13(a) shows the normal reference relationship during coding, and FIGS. 13(b) to 13(d) show three modifications of the newly fabricated VOB unit.

DETAILED DESCRIPTION OF THE PREFERRED EMBODIMENTS

Embodiment 1

Figure 1:
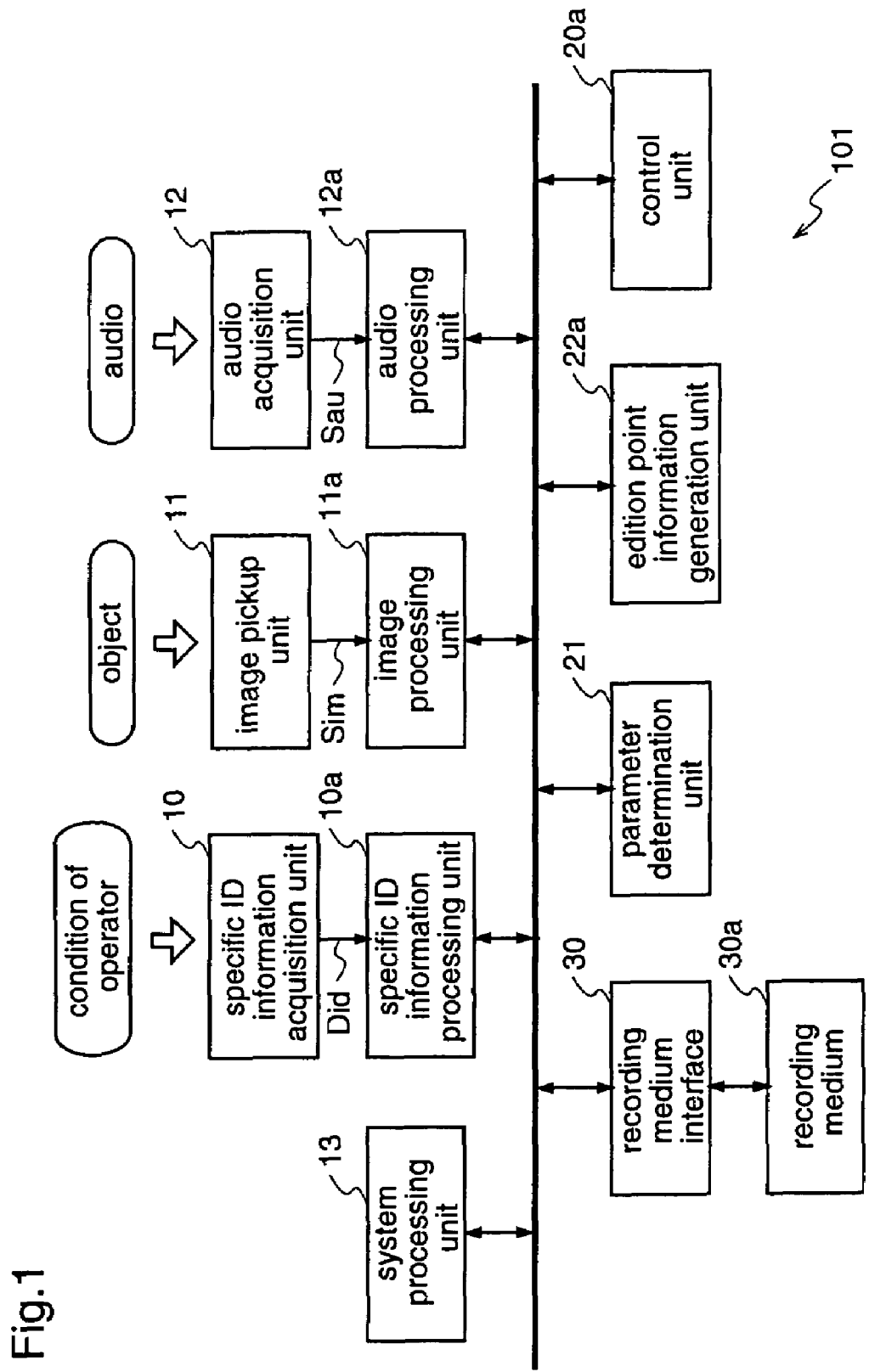
FIG. 1 is a block diagram for explaining an image pickup apparatus according to a first embodiment of the present invention.
Figure 2:
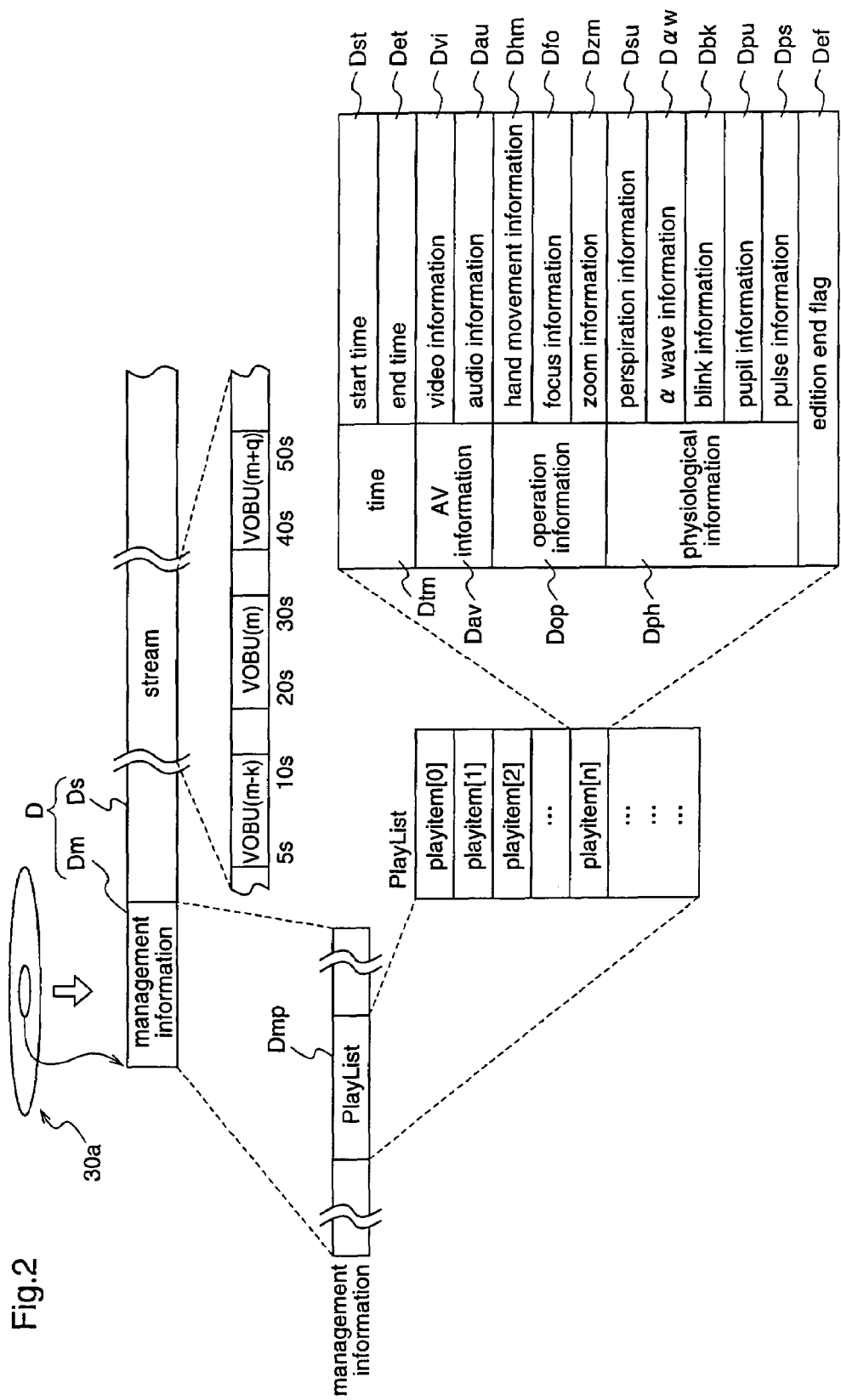
FIG. 2 is a diagram for explaining an AV stream which is recorded on a recording medium in the image pickup apparatus according to the first embodiment.

FIGS. 1 and 2 are diagrams for explaining an image pickup apparatus according to a first embodiment of the present invention. FIG. 1 is a block diagram illustrating the whole construction of the image pickup apparatus, and FIG. 2 is a diagram illustrating an AV stream obtained by the image pickup apparatus.

The image pickup apparatus 101 according to the first embodiment obtains an image signal Sim and an audio signal Sau by shooting an object, subjects the obtained image signal Sim and audio signal Sau to signal processing based on information indicating shooting conditions, thereby generating a stream (hereinafter also referred to as AV data) D based on MPEG-2, in which a shot part that is assumed to be important for an operator is editable automatically or by a simple selecting operation according to a guidance.

To be specific, the image pickup apparatus 101 includes an image pickup unit 11 for shooting an object to output an image signal Sim, and an image processing unit 11a for subjecting the image signal Sim obtained by shooting the object to signal processings such as filtering, compressive coding, and parameter extraction, thereby extracting image information including an image parameter that indicates feature of change in the image. The change in the image is a change in the image of the object that is caused by occurrence of an event, and the image parameter is the magnitude of the change in the image or the length of a period during which the image does not change completely or substantially.

The image pickup apparatus 101 includes an audio acquisition unit 12 for obtaining audio to output an audio signal Sau, and an audio processing unit 12a for subjecting the audio signal Sau to signal processings such as filtering, compressive coding, and parameter extraction, thereby extracting audio information including an audio parameter that indicates a feature of change in audio. The change in audio is a change in audio from the object, which is caused by occurrence of an event, and the audio parameter is the magnitude of the change in the audio or the length of a period during which the audio does not change completely or substantially.

The image pickup apparatus 101 further includes a specific identification (ID) information acquisition unit 10 for obtaining specific ID information that identifies the shooting condition of the operator, and a specific ID information processing unit 10a for subjecting the obtained specific ID information Did to signal processings such as filtering and parameter extraction, thereby extracting information including a specific parameter that indicates the feature of change in the shooting condition. The change in the shooting condition is a physiological change of the operator which is caused by occurrence of an event or an operation of the image pickup operation by the operator, and the specific parameter is the magnitude of the physiological change of the operator or the degree of zoom control or focus control by the operator.

Furthermore, the image pickup apparatus 101 includes a parameter determination unit 21 for determining as to whether a shoot timing at which the shooting condition changes is appropriate as an edition point or not, on the basis of the parameters obtained by the parameter extracting processes in the image processing unit 11a, the audio processing unit 12a, and the specific ID information processing unit 10a; and an edition point information generation unit 22a for generating edition point information indicating a shoot timing which is determined to be appropriate as an edition point. The shoot timing at which the shooting condition changes includes a timing at which the image of the object changes during shooting, a timing at which audio from the object changes during shooting, and a timing at which the shooting condition changes. Further, the change in the shooting condition includes a physiological change of the operator that occurs during shooting, and a change such as zooming or focusing by the operation of the operator.

The image pickup apparatus 101 includes a system processing unit 13 for forming an audio visual (AV) stream including an image stream that is obtained by compressively coding the image signal Sim with the image processing unit 11a, an audio stream that is obtained by compressively coding the audio signal Sau with the audio processing unit 12a, and edition point information that is generated by the edition point information generation unit 22a, on the basis of the information from the image processing unit 11a, the audio processing unit 12a, and the specific ID information processing unit 10a; a recording medium 30a for holding the AV stream; a recording medium interface unit 30 which is connected between the recording medium 30a and a data bus Dbus; and a control unit 20a for controlling the above-mentioned respective parts on the basis of a user operation signal generated by an operation of the user so that a sequence of recording/playback processing is carried out.

Hereinafter, the signal processings to be performed by the respective parts will be described in detail.

The filtering to be performed on the image signal Sim by the image processing unit 11a is a process of extracting signals in a specific frequency band. The compressive coding to be performed on the image signal Sim by the image processing unit 11a is intra-frame and inter-frame predictive coding based on MPEG 2. This predictive coding is not restricted to that based on MPEG-2. It may be based on MPEG-4 or MPEG-4 AVC. Further, the parameter extraction to be performed on the image signal Sim is a process of extracting, as a parameter, a magnitude of a change in a part where the shot image suddenly changes or a duration of a state where the image does not change completely or substantially, on the basis of a motion vector indicating the motion of the image, which is used in the inter-frame predictive coding. The part where the image changes suddenly is, for example, a shot part of a specific object at which the operator points a camera in alarm. Further, an unchanged part of the image is, for example, a shot part which is taken when the view point of the operator is fixed to a specific direction.

The filtering to be performed on the audio signal Sau by the audio acquisition unit 12 is a process of extracting only signals in a specific frequency band. The compressive coding to be performed on the audio signal Sau by the audio acquisition unit 12 is a process for generating compressed audio data by compressing the audio signal Sau, which process corresponds to the coding process for the image signal, such as MPEG-2 or MPEG-4. Further, the parameter extraction to be performed on the audio signal Sau is a process of extracting, as a parameter, the magnitude of change in a part where the audio changes suddenly or a duration of a state where the audio does not change completely or substantially, on the basis of the magnitude of change in the audio signal. The part where the audio changes suddenly is, for example, a recorded part that is taken when a person being shot starts to speak, or when playing of music is started in a concert or the like, or when sound from a pistol or a whistle is generated as a starting sign in an athletic meeting or the like. Further, an unchanged part of the audio is a recorded part in a silent state that occurs for a moment during an intermission of a stage or the like.

The filtering to be performed on the specific ID information Did by the specific ID information processing unit 10a is a process of extracting only a specific frequency component of the output signal from the specific ID information acquisition unit 10 as the specific ID information Did. The parameter extraction to be performed on the specific ID information Did by the specific ID information processing unit 10a is a process of extracting, as a parameter, the magnitude of change in a part where the value of the specific ID information changes suddenly or greatly, or a duration of a state where the value of the specific ID information does not change completely. The part where the specific ID information changes suddenly corresponds to, for example, a characteristic change in the physiological phenomenon of the operator, which occurs when the operator starts to get nervous due to concentration. The characteristic change in the physiological phenomenon is, for example, a significant change in the physiological phenomenon of the operator which occurs during shooting. Further, the physiological phenomenon to be detected includes perspiration, blink, change in pupil, and pulse, and the specific ID information processing unit 10a has a sensor for detecting the change in the physiological phenomenon such as perspiration or blink, which sensor corresponds to the type of the physiological phenomenon. For example, perspiration can be monitored by a sensor which measures the heat conductivity of the hand of the operator. The physiological phenomenon of the operator as the specific ID information is not restricted to those mentioned above.

Next, the process of determining an edition point will be described.

In this first embodiment, there are six kinds of processes as follows for determining whether a shoot timing at which the shooting condition changes is appropriate as an edition point or not, by the parameter determination unit 21.

In the first determination process, it is checked whether the sizes of motion vectors of all macroblocks within a frame or the size of a motion vector of a specific macroblock within a frame, which is a parameter supplied from the image processing unit 11a, exceed a predetermined threshold value or not, and a shoot timing at which the size of the motion vector exceeds the threshold value is determined to be appropriate as an edition point.

When the sizes of the motion vectors of all macroblocks within the frame exceed the predetermined threshold value, it can be considered that the magnitude of vibration of the image pickup apparatus body exceeds a threshold value or the frame luminous level changes suddenly.

In the second determination process, it is checked whether the state where the magnitude of change in a motion vector or the magnitude of change in a focus distance is lower than a threshold value continues for a predetermined period of time or not, and a shoot timing at which it continues for the predetermined period of time is determined to be appropriate as an edition point.

When the change in the size of the motion vector or the magnitude of change in the focus distance is maintained under the threshold value, it is considered that the view point of the operator is kept unchanged.

In the third determination process, it is checked whether the magnitude of change in the dynamic range of audio, which is the parameter from the audio processing unit 12a, exceeds a predetermined threshold value or not, and a shoot timing at which it is judged that the threshold value is exceeded is determined to be appropriate as an edition point. The audio change includes not only a change in the sound from the object but also a sound made by the operator, such as cough.

In the fourth determination process, it is checked whether the state where the dynamic range of audio does not change continues for a predetermined period of time or not, and a shoot timing at which it is judged that the unchanged state continues for the predetermined period is determined to be appropriate as an edition point. In this case, the head position of the unchanged part is the edition point.

In the fifth determination process, it is checked whether the magnitude of change in the heart rate of the operator or the magnitude of change in the heat conductivity of the hand of the operator, which is the parameter from the specific ID information processing unit 10a, exceeds a predetermined threshold value or not, and a shoot timing at which it is judged that the threshold value is exceeded is determined to be appropriate as an edition point.

In the sixth determination process, it is checked whether a change in the number of blinks or the magnitude of change in the pupil exceeds a threshold value or not, and a shoot timing at which it is judged that the threshold value is exceeded is determined to be appropriate as an edition point.

With respect to an operation that is unconsciously carried out such as focusing or zooming, whether a shoot timing at which this operation is carried out is appropriate as an edition point or not may be checked on the basis of not the parameter supplied from the image processing unit 11a but an output level of a special sensor. In this case, concretely speaking, the specific ID information acquisition unit 10 obtains the output of the special sensor as specific ID information indicating the shooting condition, and the specific ID information processing unit 10a obtains, on the basis of the specific ID information, the specific parameter indicating the magnitude of adjustment such as focusing or zooming by the operation of the operator, which is the magnitude of change in the shooting condition. Then, the parameter determination unit 21 checks the specific parameter to determine as to whether a shoot timing at which the shooting condition such as focusing or zooming changes is appropriate as an edition point or not. Further, there may be provided a sensor for measuring the brain wave of the operator, such as alpha wave. In this case, it is determined as to whether a shoot timing at which the alpha wave changes is appropriate as an edition point or not, on the basis of the output level of the sensor. In this case, particularly speaking, the specific ID information acquisition unit 10 obtains the output of the alpha wave measuring sensor as specific ID information indicating the shooting condition, and the specific ID information processing unit 10a obtains, on the basis of the specific ID information, the specific parameter indicating the magnitude of change in the alpha wave of the operator which indicates the shooting condition. Then, the parameter determination unit 21 checks the specific parameter to determine as to whether a shoot timing at which the alpha wave of the operator indicating the shooting condition changes is appropriate as an edition point or not. Further, the parameter of image and sound can be detected using a special sensor, instead of extracting the parameter by processing an image signal and an audio signal obtained by shooting.

Further, in this first embodiment, the edition point information generation unit 22a generates information indicating the shoot timing that is determined to be appropriate as an edition point, and information indicating which parameter is used to check the shoot timing among, for example, change in the audio, change in the video, and change in the shooting condition, and thereafter, outputs them to the system processing unit 13. Further, the edition point information generation unit 22a sets an I picture at the beginning of a VOB unit which is previous to and closest to the shoot timing determined as an edition point, to a picture to be used as an access point during edition, and outputs, to the system processing unit 13, information indicating that the edition point is set to the I picture. The system processing unit 13 updates a play list which is management information included in the AV stream D, on the basis of the information from the edition point information generation unit 22a.

More specifically, the play list of the AV stream formed by the system processing unit 13 includes the edition point information indicating the shoot timing which is determined to be appropriate as an edition point, the information indicating which parameter is used to check the shoot timing that is determined to be appropriate as an edition point, and the information indicating which picture is set as a picture to be used as an access point during edition.

However, the picture to be used as an access point is not restricted to an I picture that is previous to and closest to a shoot timing at which the shooting condition of video or audio changes, which is determined as an edition point. For example, a picture to be an edition point may be determined considering a delay time from a timing when an event that causes a change in the image of the object or a change in the audio outputted from the object or a change in the shooting condition of the operator to a timing when a parameter due to this event is detected, according to factors such as changes in video and audio at which setting of an edition point is carried out. For example, an I picture which is closest to a shoot timing that is by the delay time earlier than the timing at which the shooting condition actually changes may be set as a picture to be used as an edition point. In this case, the delay time may be a time which is determined according to focus information or a fixed time that has previously been determined equally for all factors or separately for the respective factors.

Further, in this first embodiment, since the AV stream is based on MPEG-2, the time at which an event that changes the video, audio, or shooting condition is included in the play list as a time at which a parameter indicating the feature of the change in the video, audio, or shooting condition is detected, to be written in the management information recording area of the stream. However, the stream may be based on MPEG-4 AVC. In this case, only the parameter detection time is recorded in an additional information recording area (SEI) of the stream.

Furthermore, in this first embodiment, the control unit 20a outputs a command signal to the parameter determination unit 21 on the basis of a scenario selected by the user before shooting to determine a factor for which setting of an edition point should be performed, such as sound, image, operator's physiological phenomenon, or the like, and further, the control unit 20a determines a decision threshold to be used when determining a shoot timing at which the factor for the edition point setting changes as an edition point, i.e., the threshold value of the parameter.

Furthermore, when the user selects a location of shooting such as an athletic meeting, a concert, a wedding ceremony, or a travel according to a guidance of the image pickup device, the control unit 20a sets the decision threshold to the various kinds of factors for edition point setting to one of plural values which have previously determined, according to a pattern of change in the shooting condition, for example, a pattern of change in audio, a pattern of change in brightness, a pattern of change in physiological phenomenon of the operator. However, the predetermined values provided as the decision thresholds for the various kinds of factors can be independently adjusted according to the user's preference.

The image pickup apparatus 101 includes a reproduction unit (not shown) for decoding the AV stream recorded on the recording medium, on the basis of the control signal from the control unit 20a, thereby to reproduce the stream.

Next, the structure of the AV data recorded on the recording medium will be described in brief.

FIG. 2 is a diagram for explaining the structure of the AV data recorded on the recording medium.

The recording medium is a disk-shaped recording medium such as a DVD (Digital Versatile Disk). However, the recording medium is not restricted to the disk-shaped recording medium such as a DVD. For example, it may be an HDD (Hard Disk Drive), a memory card, or a magnetic tape. Further, an AV stream D including a stream Ds which is obtained by coding an image signal Sim and an audio signal Sau corresponding to a single contents and management information Dm corresponding to the contents is written in the recording medium. The management information Dm is written in an inner-side area near the center of the disk-shaped recording medium while the stream Ds is written in an area outer than the inner-side area. Further, the stream Ds is divided into VOB units VOBUs.

The management information Dm includes a play list Dmp, and the play list Dmp includes a plurality of auxiliary information playitem [0], [1], [2], . . . , [n], . . .

For example, the stream Ds of the coded data D shown in FIG. 2 includes a VOB unit VOBU(m−k), a VOB unit VOBU (m), and a VOB unit VOBU(m+q), and the auxiliary information playitem[n] of the play list corresponding to the specific VOB unit VOBU(m) includes time information Dtm, AV information Dav, operation information Dop, physiologic information Dph, and an edition end flag Def. The time information Dtm includes information Dst indicating the start time of the VOB unit VOBU(m), and information Det indicating the end time of the VOB unit VOBU(m). The AV information Dav includes information Dvi indicating a parameter relating to the image, and information Dau indicating a parameter relating to the audio. The operation information Dop includes information Dhm indicating the degree of hand movement, information Dfo indicating the operation quantity at focusing operation, and information Dzm indicating the operation quantity at zooming operation. The physiologic information Dph includes perspiration information Dsu indicating the amount of perspiration of the operator, α wave information Daw indicating the intensity of α wave of the operator, blink information Dbk indicating the frequency of blink of the operator, pupil information Dpu indicating the degree of change in the pupil of the operator, and pulse information Dps indicating the pulse of the operator. In this way, the time at which an event that changes the image, audio, or shooting condition occurs is substantially included in the play list and written into the management information recording area of the steam, as the time at which the parameter indicating the feature of the change in the image, audio, or shooting condition is detected.

Next, the operation will be described.

[Setting Operation before Shooting]

Initially, the manual setting operation before shooting will be described.

The operator sets a decision threshold to be used when checking as to whether a shoot timing at which the shooting condition changes is appropriate as an edition point or not, according to an event such as an athletic meeting or a wedding ceremony.

As for the decision threshold, by selecting a scenario corresponding to an athletic meeting or a wedding ceremony from among plural scenarios which have previously been set on the image pickup apparatus, a decision threshold corresponding to each individual factor for setting an edition point can be set to a value according to the selected scenario. In this first embodiment, however, the operator performs manual setting.

Figure 3:
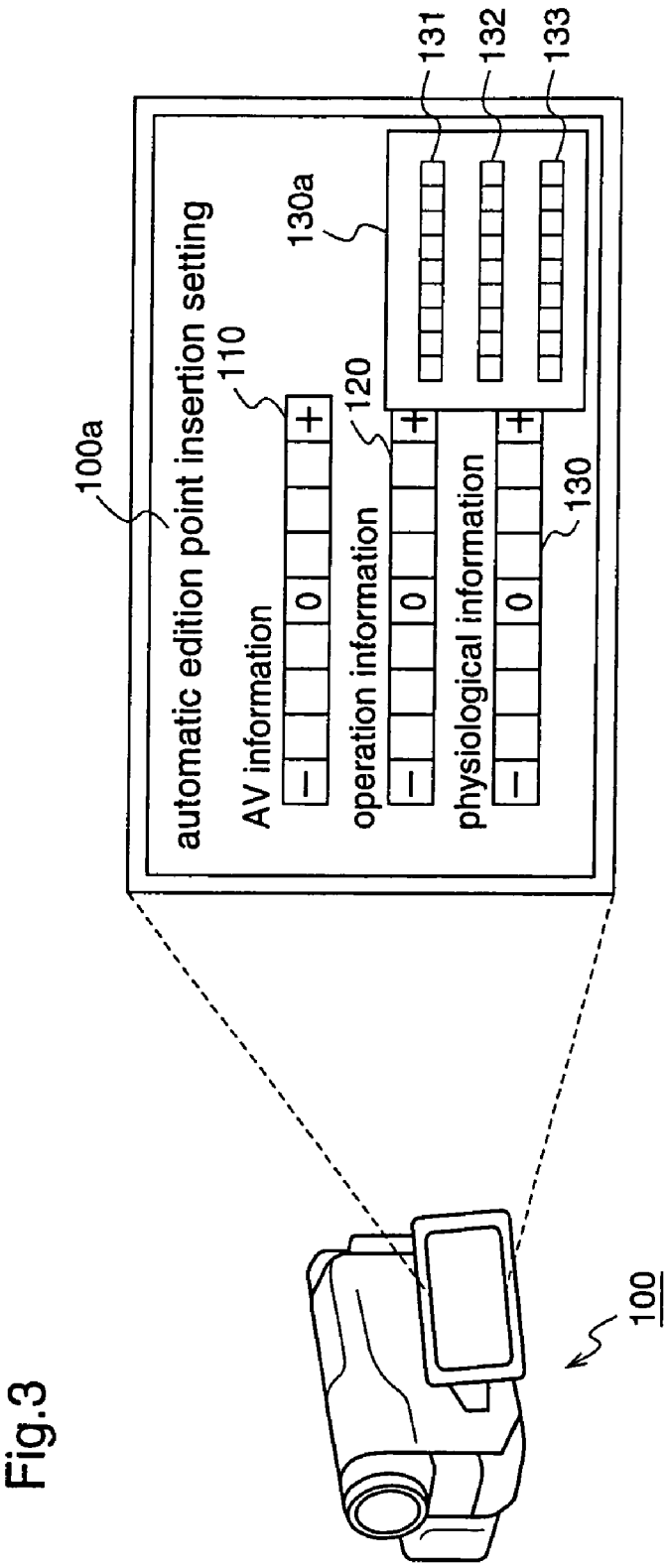
FIG. 3 is a diagram for explaining an operation for setting conditions relating to automatic insertion of edition points in the image pickup apparatus according to the first embodiment.

FIG. 3 shows a screen for performing edition point insertion setting on the image pickup apparatus 100.

There are displayed, on the setting screen 100a, an AV information setting button 110, an operation information setting button 120, and a physiologic information setting button 130. Further, on the lower right part of the setting screen 100a, a detail setting screen 130a for performing more detailed setting of physiologic information is displayed. On the detail setting screen 130a, there are displayed a perspiration information setting button 131, a pupil information setting button 132, and a pulse information setting button 133. Although it is not shown in FIG. 3, a detail setting screen for performing more detailed setting of the AV information or a detail setting screen for performing more detailed setting of the operation information can also be displayed.

Each button can set the decision threshold corresponding to each element at an arbitrary level between a minimum level shown by "−" and a maximum level shown by "+". Further, "0" shows an intermediate level between "−" and "+".

For example, if the level of the decision threshold relating to the perspiration information is high, a shoot timing at which the perspiration changes is determined to be appropriate as an edition point even when the change in the perspiration is relatively small. On the other hand, if the level of the decision threshold relating to the perspiration information is low, a shoot timing at which the perspiration changes is determined to be inappropriate as an edition point even when the change in the perspiration is relatively large.

For example, when performing shooting in a competition meeting such as an athletic meeting, it is considered that, when a performance or a game is started, a great change in audio such as a whistle might occur. Therefore, the decision threshold to the audio element of the AV information is set at a level higher than the average level, and furthermore, the decision threshold to the pulse element of the perspiration information is also desired to be set at a high level because the operator may feel nervous during the competition.

When shooting a scene during a travel or the like, the operator sets the decision threshold to the image element of the AV information at a level higher than the average level. Further, since it is considered that a distant object might be shot, the decision threshold for the amount of operation such as focusing or zooming should be set at a high level.

Furthermore, in a wedding ceremony, the operator sets the decision thresholds of the video parameter and the audio parameter of the AV information at levels higher than the average levels, and the decision threshold of the parameters of the respective elements of the physiologic information may be set at relatively high levels.

The above-mentioned setting of the decision thresholds is carried out by the control unit 20a according to the user operation, i.e., the operator's manual operation, and the control unit 20 outputs a control signal indicating the decision threshold for each element, which is set according to the user operation, to the parameter determination unit 21. Thereafter, when the user performs shooting, the parameter determination unit 21 checks each parameter on the basis of the corresponding decision threshold (threshold level) that is set by the control unit 20a to determine as to whether the shoot timing at which the video, audio, or shooting condition changes is appropriate as an edition point or not.

[Operation During Shooting]

Subsequently, the operation of the image pickup apparatus during shooting will be specifically described.

Figure 4:
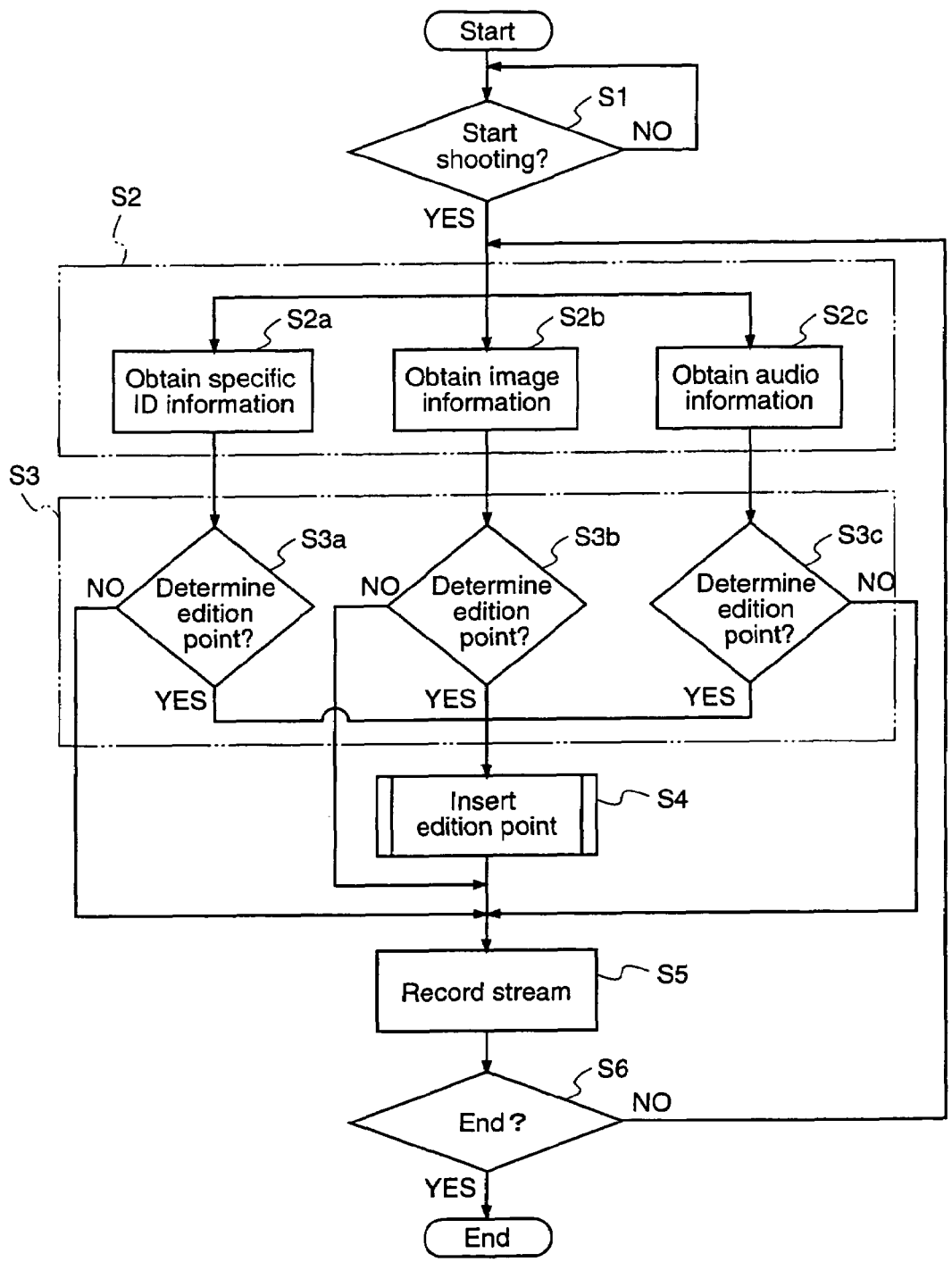
FIG. 4 is a diagram for explaining the operation of the image pickup apparatus according to the first embodiment.

FIG. 4 is a diagram for explaining the operation flow of the image pickup apparatus according to the first embodiment.

When shooting is started (step S1), the image pickup apparatus 101 obtains the image information, the audio information, and the information relating to the shooting condition (step S2).

To be specific, in step S2, the following processes are carried out in parallel with each other: a process of shooting an object with the image pickup unit 11 to output an image signal Dim; a process of taking sound with the audio acquisition unit 12 to output an audio signal Dau; and a process of detecting an operation of the image pickup apparatus by the operator and a physiological change of the operator with the specific ID information acquisition unit 10 to output specific ID information Did relating to the operation quantity and the physiological change.

Then, the specific ID information processing unit 10a detects parameters, such as the amount of operation in focusing or zooming operation and the amount of change in the perspiration, the frequency of blinks, or the pulse rate which indicates the magnitude of the physiological change of the operator, on the basis of the specific ID information Did from the specific ID information acquisition unit 10 and the control signal from the control unit 20a (step S2a). Further, the image processing unit 11a subjects the image signal to predictive coding based on MPEG-2 to generate an image stream on the basis of the image signal Dim from the image pickup unit 11 and the control signal from the control unit 20a, and obtains image information including the parameter of the image, such as the magnitude of the image change in a part where the image changes suddenly, on the basis of motion vectors used in the predictive coding (step S2b). The audio processing unit 12a subjects the audio signal Dau to coding on the basis of the audio signal Dau from the audio acquisition unit 12 and the control signal from the control unit 20a, thereby to generate an audio stream, and further, the audio processing unit 12a obtains, on the basis of the audio signal, audio information including a parameter of audio such as the magnitude of audio change in a part where the audio suddenly changes (step S2c).

Next, the parameter determination unit 21 checks whether a shoot timing at which the parameter is detected is appropriate as an edition point or not, on the basis of the parameter relating to the user operation or the physiological change of the operator, the parameter relating to the image, or the parameter relating to the audio, as well as the decision thresholds which are set for the respective parameters (step S3).

Next, the edition point information generation unit 22a generates edition point information indicating the shoot timing which is determined to be appropriate as an edition point, and generates edition point picture information indicating that a picture to be used as an edition point is set to an I picture that is positioned at the beginning of a VOB unit that is previous to and closest to the shoot timing (step S4).

Thereafter, the system processing unit 13 generates an AV stream including the image stream, the audio stream, the edition point information, and the edition point picture information, on the basis of the control signal from the control unit 20a, and outputs the stream to the recording medium interface 30. Then, the recording medium interface records the inputted AV stream on the recording medium (step S5).

Hereinafter, the process in step S3 for determining an edition point will be described.

To be specific, with respect to the specific parameter detected in the specific ID information processing unit 10a, the image parameter detected in the image processing unit 11a, and the audio parameter detected in the audio processing unit 12a, the parameter determination unit 21 checks whether the shoot timings at which these parameters are detected are appropriate as edition points or not, on the basis of the control signal indicating the decision threshold from the control unit 20a.

For example, the parameter relating to hand movement which is detected in the specific ID information processing unit 10a is the magnitude of hand movement of the operator. When the detected magnitude of hand movement is larger than the decision threshold which has been set before shooting, i.e., the threshold value of the magnitude of hand movement, the shoot timing at which the parameter relating to hand movement is detected is determined to be appropriate as an edition point. When the magnitude of hand movement is smaller than the decision threshold, the shoot timing is determined to be not appropriate as an edition point (step S3a). Further, the parameter relating to focusing and the parameter relating to zooming, which are detected by the specific ID information processing unit 10a, are a focus variation due to focus operation and a zoom variation due to zoom operation, respectively. With respect to these parameters, like the parameters relating to hand movement, it is determined whether a shoot timing at which the parameter is detected is appropriate as an edition point or not, according to whether the variation is larger than the decision threshold which has been set before shooting (step S3a).

Further, the parameter relating to perspiration which is detected by the specific ID information processing unit 10a is the amount of perspiration of the operator. When the detected amount of perspiration is larger than the decision threshold which has been set before shooting, i.e., the threshold value of the amount of perspiration, the shooting timing at which the parameter relating to perspiration is determined to be appropriate as an edition point. When the amount of perspiration is smaller than the decision threshold, the shoot timing is determined to be inappropriate as an edition point. Further, the parameter relating to $\alpha$ wave, the parameter relating to blink, the parameter relating to pupil, and the parameter relating to pulse are the size of $\alpha$ wave, the frequency of blink, the decree of change in pupil, and the degree of change in pulse rate, respectively. With respect to these parameters relating to the physiological changes of the operator, like the parameter relating to perspiration, it is determined as to whether the shoot timing at which each parameter is detected is appropriate as an edition point or not, according to whether the value is larger than the decision threshold that has been set before shooting (step S3a).

The parameter relating to the image, which is detected by the image processing unit 11a, is the magnitude of change in a part where the image suddenly changes or a period of time in which a part where the image does not change completely or substantially continues. When the magnitude of change in the part where the image changes suddenly or the duration in which the image does not change is larger than the decision threshold which has been set before shooting, i.e., the threshold value of the magnitude of change or the threshold value of the duration of the state, respectively, it is determined that the shoot timing at which the parameter is detected is appropriate as an edition point. Otherwise, it is determined that the shoot timing is not appropriate as an edition point (step S3b).

The parameter relating to the audio, which is detected by the audio processing unit 12a, is the magnitude of change in a part where the audio changes significantly or a period of time in which the audio does not change completely or substantially continues. When the magnitude of change in the part where the audio changes suddenly or the duration in which the audio does not change is larger than the decision threshold which has been set before shooting, i.e., the threshold value of the magnitude of change or the threshold value of the duration of the state, respectively, it is determined that the shoot timing at which the parameter is appropriate as an edition point. Otherwise, it is determined that the shoot timing is not appropriate as an edition point (step S3c).

Thereafter, every time a shoot timing at which the parameter is detected is determined to be appropriate as an edition point by the parameter determination unit 21 on the basis of the parameters supplied from the respective processing units 10*a*, 11*a*, and 12*a*, the edition point information generation unit 22*a* generates edition point information indicating the shoot timing, and generates edition point picture information indicating that a picture to be used as an edition point is set to an I picture at the beginning of a VOB unit which is previous to and closest to the shoot timing (step S4).

Figure 5A:
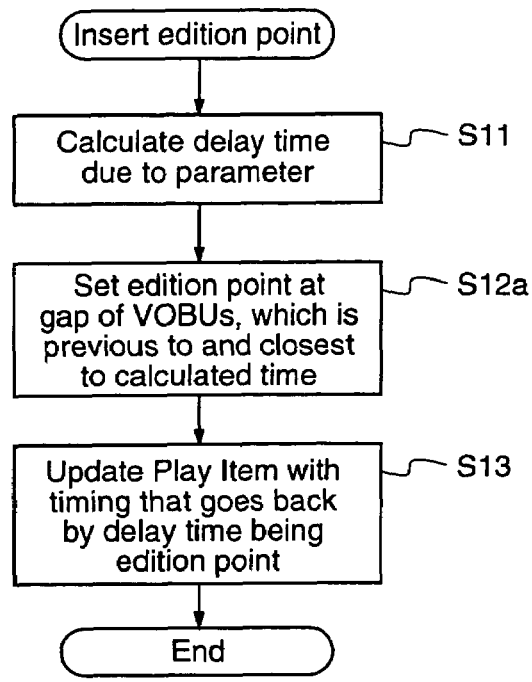
Figure 5B:
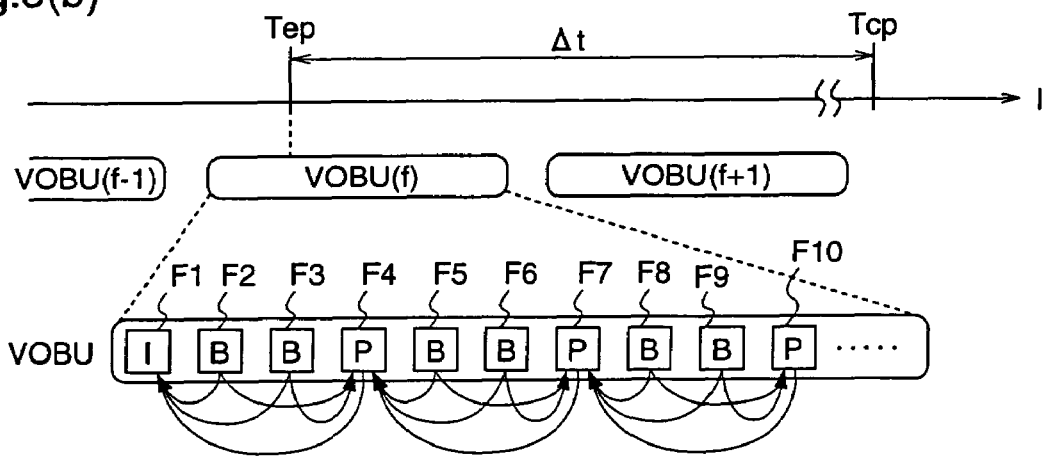

FIGS. 5(*a*) and 5(*b*) are diagrams for explaining the edition point setting process in detail. FIG. 5(*a*) shows the process flow, and FIG. 5(*b*) shows the relationship between a shoot timing and a gap between VOB units in the image stream.

In this first embodiment, the edition point information generation unit 22*a* calculates a delay time due to the parameter, i.e., a period of time from when an event occurs to when the shooting condition changes due to the occurrence of the event, which depends on the parameter (step S11).

Next, the edition point information generation unit 22*a* sets an edition point at a gap between VOB units (i), which is prior to and closest to the shoot timing Tep that is by the calculated delay time Δt earlier than the shoot timing at which the parameter is detected (step S12*a*).

Thereafter, the edition point information generation unit 22*a* generates edition point information indicating the shoot timing Tep that is determined to be appropriate as an edition point and, as shown in FIG. 5(*b*), generates edition point setting information indicating that a picture to be used as an edition point is set at an I picture F1 positioned at the beginning of a VOB unit VOBU(f) which is previous to and closest to the shoot timing. Then, the edition point information generation unit 22*a* changes the play item of the AV stream so as to indicate that the shoot timing Tep is set at the edition point (step S13).

In FIG. 5(*b*), the picture F1 is an I picture which does not refer to another picture when it is coded or decoded, pictures F4, F7, and F10 are P picture which refer to a forward I picture or P picture when they are coded or decoded, and pictures F2, F3, F5, F6, F8, and F9 are B pictures which refer to a forward I picture or P picture and a backward P picture when they are coded or decoded.

Each VOB unit comprises plural pictures, and an I picture is positioned at the beginning of each VOB unit. Two B pictures are placed between adjacent I picture and P picture or between adjacent two P pictures. Further, VOB units VOBU(f−1) and VOBU(f+1) are VOB units positioned before and after the VOB unit VOBU(f).

[Operation During Playback]

During playback, the AV stream recorded on the recording medium is reproduced while being automatically edited on the basis of the embedded edition point information, i.e., a start time and an end time of a play list corresponding to the VOB unit whose head picture is set as an edition point.

Reproduction of the AV stream recorded on the recording medium is not restricted to that in which the edition point is picked up to automatically edit the stream. Reproduction of the AV stream may be carried out on the basis of an edition condition set by the user so as to edit only a part of the stream that satisfies the set edition condition.

Figure 6:
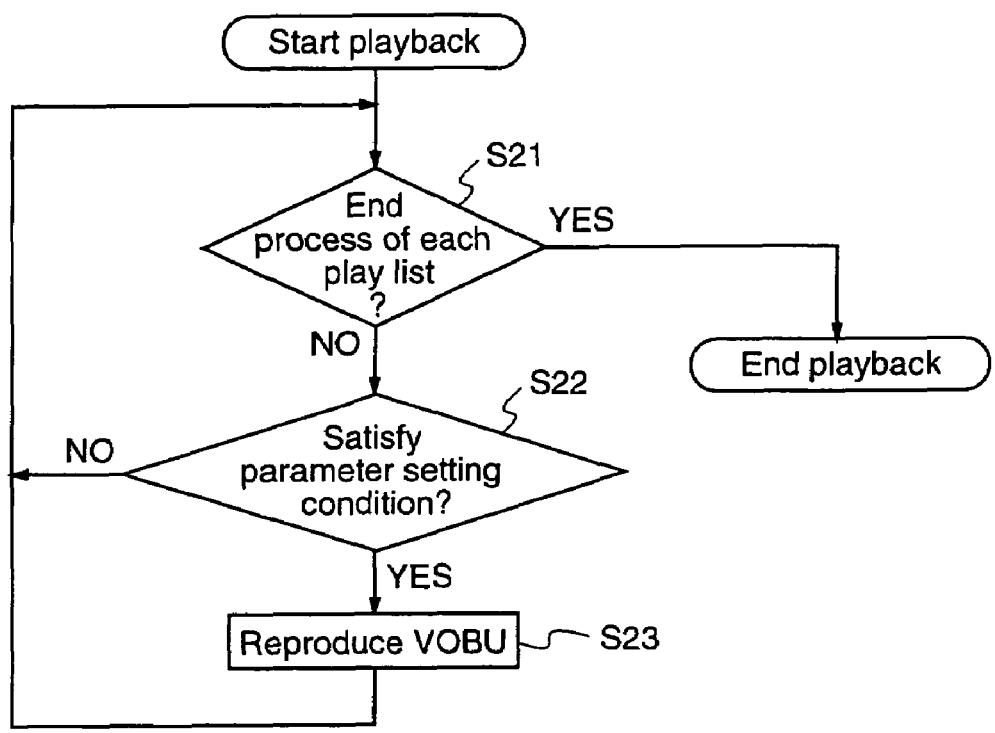
FIG. 6 is a flow chart for explaining a process of automatically editing and reproducing the AV stream obtained by the image pickup apparatus according to the first embodiment.

FIG. 6 is a diagram for explaining, for example, the process of automatically editing and reproducing the recorded AV stream on the basis of a set condition.

In the first embodiment, when reproduction of the AV stream recorded on the recording medium is started, the reproduction unit (not shown) of the image pickup apparatus 101 checks whether the process based on each item of the play list included in the AV stream is completed or not (step S21). When the process is completed, reproduction is ended.

On the other hand, when the process is not yet completed as the result of determination in step S21, the reproduction unit checks whether the edition point satisfies the edition condition or not (step S22), and reproduces the VOB unit VOBU that satisfies the set condition relating to the parameter (step S23).

The information relating to the edition point which is included in the AV stream can be utilized for an editing work of the AV stream by the user as well as for automatic editing.

Figure 7:
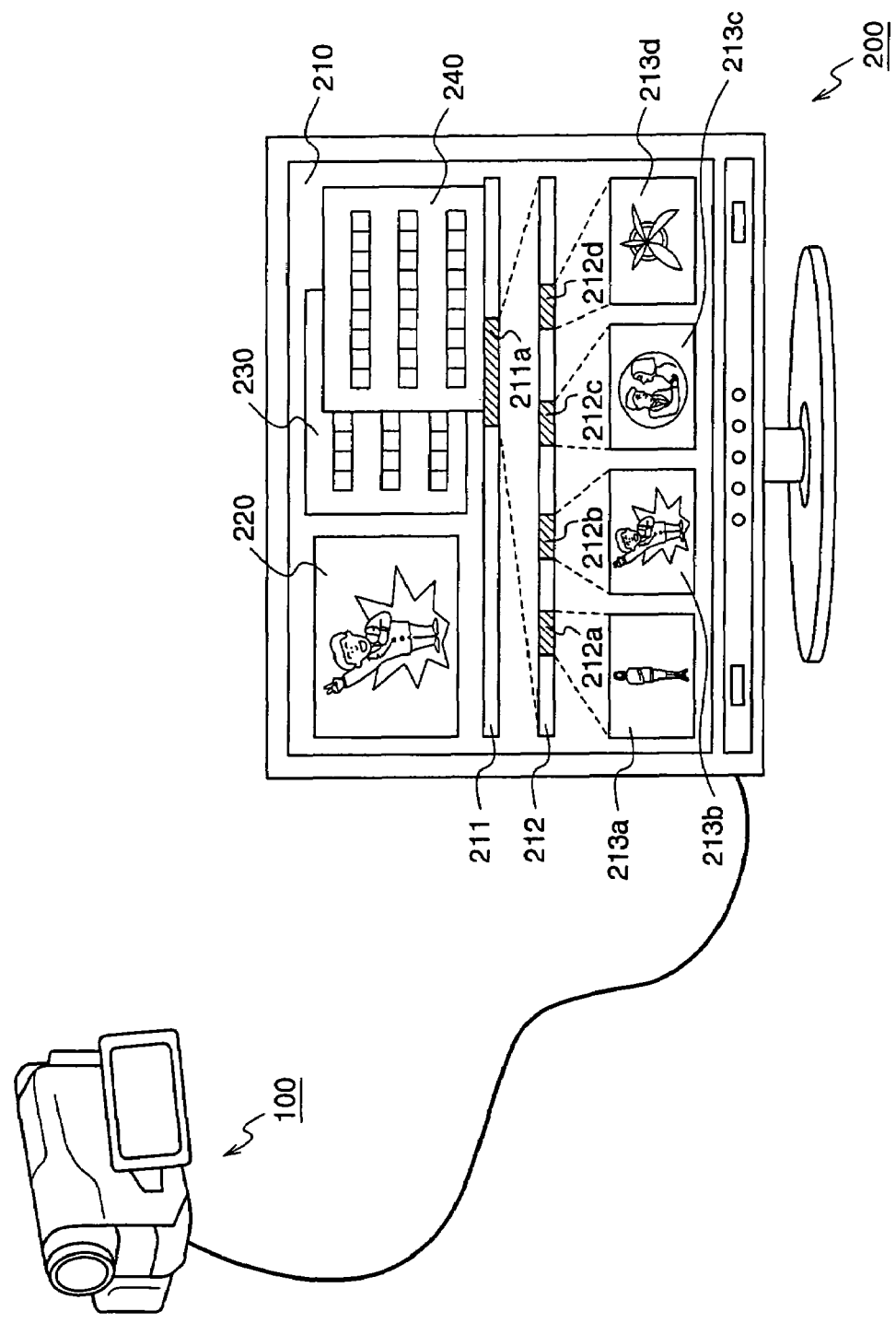
FIG. 7 is a diagram for explaining a method for utilizing edition points in the image pickup apparatus according to the first embodiment.

FIG. 7 is a diagram for explaining the method of utilizing the edition point, illustrating a display screen for editing the AV stream recorded on the recording medium.

In FIG. 7, a display unit 200 is a display of a television set or a personal computer, and a display screen 210 thereof includes a band-like indicator 211 showing the whole AV stream corresponding to one contents recorded on the recording medium, a band-like indicator 212 showing an enlarged specific VOB unit 211*a* in the AV stream, and thumbnail screens 213*a*, 213*b*, 213*c*, and 213*d* of pictures 212*a*, 212*b*, 212*c*, and 212*d* as edition points.

Further, there is a processing thumbnail display area 220 on the display screen 210, and a picture of an edition point for which the user adjusts the edition condition is displayed in this area 220. On the display screen 210, operation areas 230 and 240 corresponding to the respective elements, for adjusting the decision threshold of the parameter which is the edition condition to be satisfied by the picture of the edition point is displayed adjacent to the processing thumbnail display area 220.

The user can adjust the edition condition to be satisfied by the picture set at each edition point, i.e., the decision threshold of the parameter, on the display screen 210.

On the display for supporting the edition, all the I pictures may be displayed by thumbnail screens, and the thumbnail screen of the picture to be the edition point may be larger than the thumbnail screens of the other I pictures.

Further, on the display for supporting the edition, the order of thumbnail displaying the pictures to be the edition points may be the order according to the types of the causes of the parameters, or the order of the sizes of the parameters which are normalized with respect to all causes.

Furthermore, on the display for supporting the edition, the pictures set as the edition points may be successively displayed in a slide slow format. In this case, a primary edition may be performed by selecting necessary edition points so as to support a more minute secondary edition.

Moreover, on the display for supporting the edition, points at several seconds from the edition points may be automatically connected to change the edition points in accordance with the tone or tempo of favorite BGM, thereby display the edition points in digest. In this case, the recorded AV stream may be reedited to such digest version, or it may be merely displayed in such manner without reediting the same.

Further, the control unit 20*a* or the edition point information generation unit 22*a* may manage a flag for checking whether the edition is completed or not, and the recorded AV stream may have information as to whether it is an edited one or not.

Furthermore, in the edited AV stream, only the play list may be changed without changing the actual data section.

As described above, the image pickup apparatus 101 according to the first embodiment is provided with the image processing unit 11*a* for extracting an image parameter indicating a feature of change in image, from an image signal Dim obtained by shooting an object; the audio processing unit 12a for extracting an audio parameter indicating a feature of change in audio, from an audio signal Dau obtained by shooting the object; and the specific ID information processing unit 10a for extracting a specific parameter indicating a feature of change in shooting condition, on the basis of information Did indicating a physiological change of an operator; wherein the extracted parameter is compared with a predetermined decision threshold to determine whether a shoot timing at which the image or audio changes is appropriate as an edition point or not. Therefore, it is possible to generate an AV stream in which a shot part that seems to be important for the operator is automatically editable.

Further, in this first embodiment, an edition point is set at a gap between VOB units in the coded AV data, which gap is closest to a shoot timing that is determined to be appropriate as an edition point. Therefore, even when the image signal obtained by shooting is coded, setting of an edition point can be carried out without processing the coded image signal.

Furthermore, in this first embodiment, an edition point is set at a shoot timing which is earlier than the shoot timing at which the shooting condition changes, by a delay time from when an event occurs to when the shooting condition changes due to the occurrence of the event. Therefore, it is possible to set the edition point approximately at the timing when the event actually occurs.

Furthermore, in this first embodiment, the decision threshold used when determining that a shoot timing at which the shooting condition changes is appropriate as an edition point is set manually by the user. However, the decision threshold for each factor for setting an edition point can be set by selecting a scenario corresponding to an athletic meeting or a wedding ceremony from among plural scenarios which have previously been set on the image pickup apparatus.

The image pickup apparatus which determines the decision threshold for each factor by selecting a scenario can be realized as follows. For example, in the image pickup apparatus according to the first embodiment, the control unit has table information indicating correspondences between the respective ones of the plural scenarios and combinations of threshold levels for the respective ones of the image parameter, the audio parameter, and the specific parameter, and sets a threshold level of the parameter corresponding to each factor described above on the basis of a scenario designated by the user's manual operation, and the table information, and further, the parameter determination unit determines whether a shoot timing at which the image, audio, and shooting condition change is appropriate as an edition point or not, on the basis of the threshold levels set by the control unit corresponding to the respective ones of the image parameter, the audio parameter, and the specific parameter.

In this case, the table information indicating correspondences between the respective ones of the plural scenarios and the combinations of the threshold levels for the respective ones of the image parameter, the audio parameter, and the specific parameter can be obtained by downloading the same from an information terminal on the network.

The combinations of the threshold levels of the respective parameters, which are included in the table information, may be obtained by combining two out of the image parameter, the audio parameter, and the specific parameter. Further, the information table may indicate correspondences between the respective ones of the plural scenarios and threshold levels each corresponding to any one of the image parameter, the audio parameter, and the specific parameter.

Embodiment 2

Figure 8:
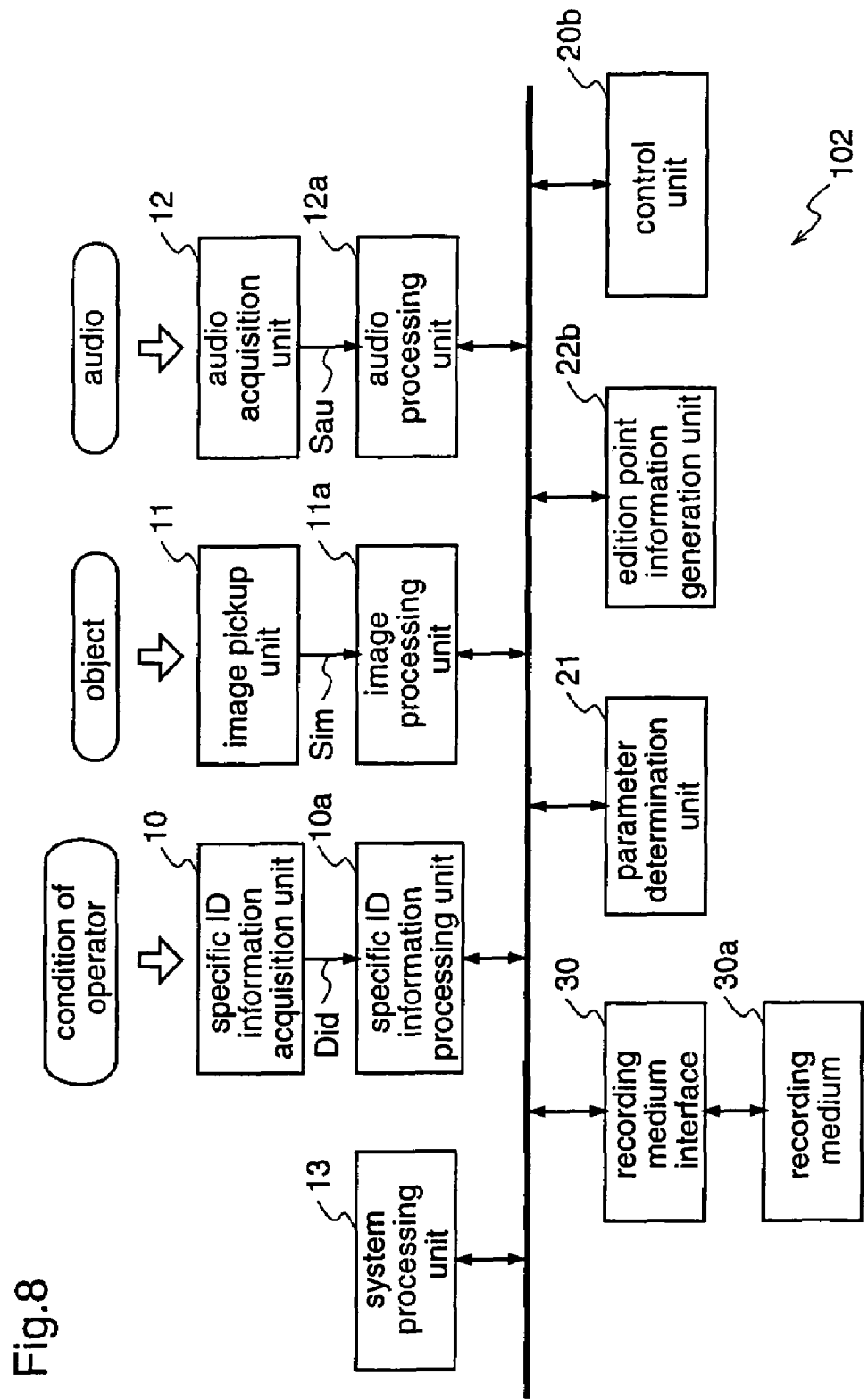
FIG. 8 is a diagram for explaining an image pickup apparatus according to a second embodiment of the present invention.

FIG. 8 is a diagram for explaining an image pickup apparatus according to a second embodiment of the present invention.

The image pickup apparatus 102 according to the second embodiment is provided with, instead of the edition point information generation unit 22a of the first embodiment, an edition point information generation unit 22b which instructs the image processing unit 11a to perform Trans-coding to change the picture type of a picture to be an edition point and neighboring pictures when the picture to be an edition point is not an I picture. Further, a control unit 20b of the second embodiment is different from the control unit 20a only in that it controls the image processing unit 11a during Trans-coding. The other constituents of the image pickup apparatus 102 of the second embodiment are identical to those of the image pickup apparatus 101 of the first embodiment.

Next, the operation of the image pickup apparatus 102 will be described.

In the image pickup apparatus 102 according to the second embodiment, the manual setting operation before shooting is carried out in the same manner as described for the first embodiment.

When shooting is started, the parameter determination unit 21 of the image pickup apparatus 102 obtains image information, audio information, and information relating to shooting conditions, like the image pickup apparatus 101 of the first embodiment, and determines whether a shoot timing at which the shooting condition changes is appropriate as an edition point or not, on the basis of a parameter of user operation or physiological change of the operator, a parameter of image, and a parameter of audio, which are extracted from the obtained information.

In this second embodiment, every time a shoot timing at which the shooting condition changes is determined to be appropriate as an edition point by the parameter determination unit 21 on the basis of the parameters supplied from the respective processing units 10a, 11a, and 12a, the edition point information generation unit 22b generates edition point information indicating the edition point, and instructs the image processing unit 11a to perform Trans-coding when a picture corresponding to the edition point is other than an I picture.

Figure 9:
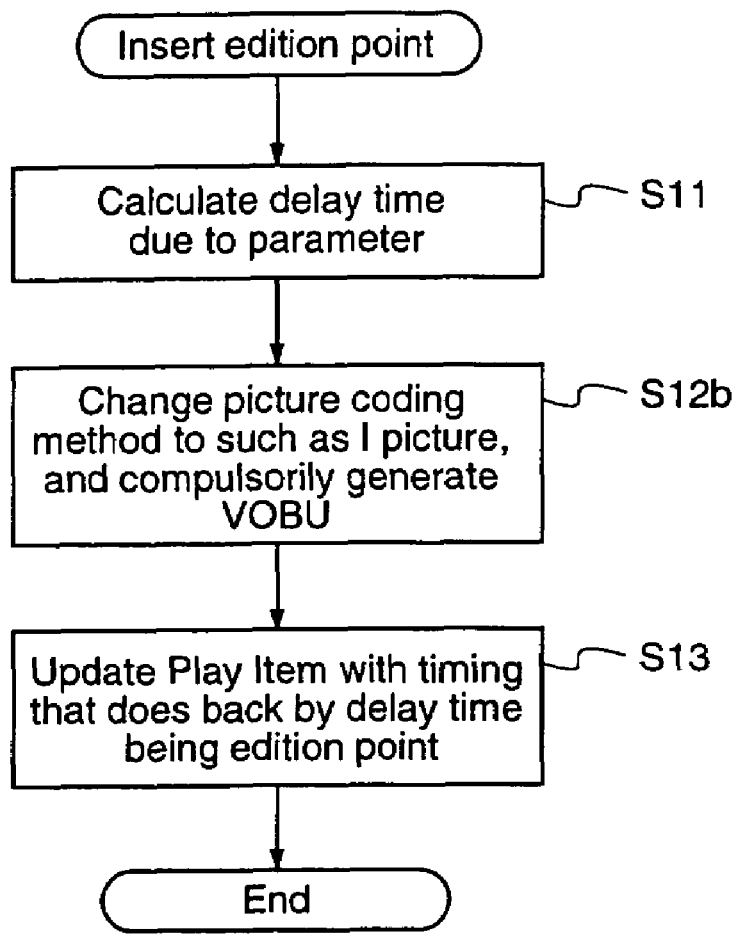
FIG. 9 shows a flow of the edition point information generation process and the Trans-coding Process.
Figure 10A:
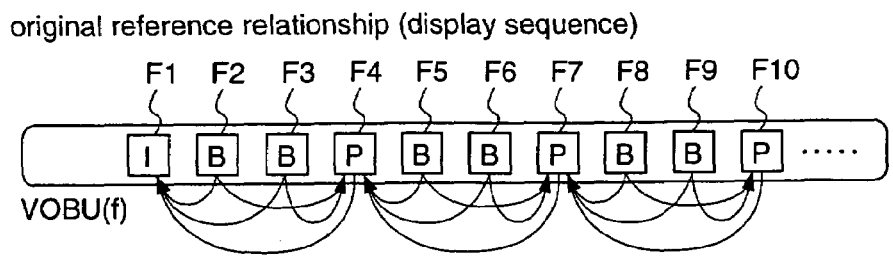
Figure 10B:
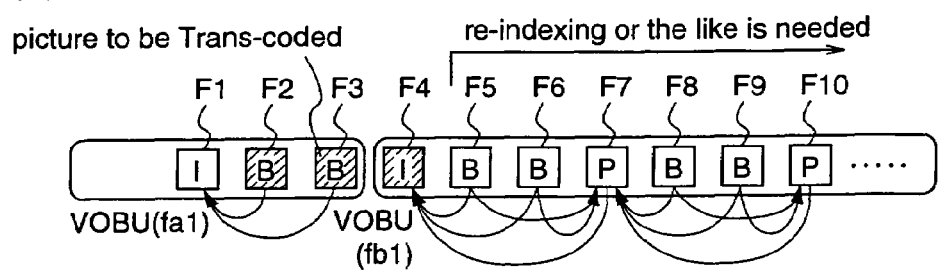
Figure 10C:
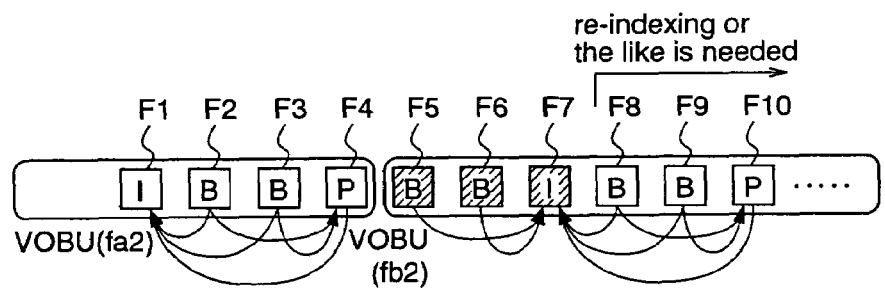
Figure 10D:
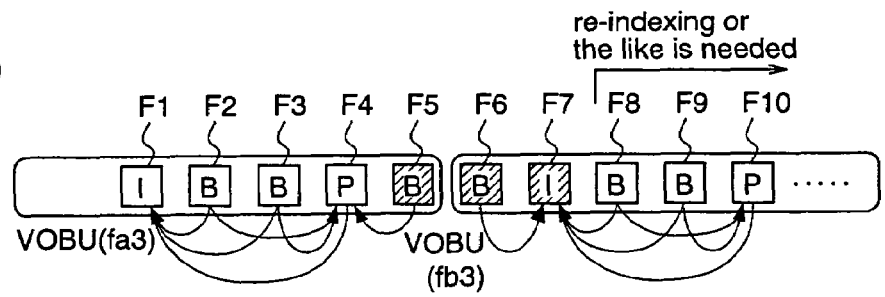

FIG. 9 shows a flow of the edition point information generation process and the Trans-coding process.

In this second embodiment, the control unit 20b calculates a delay time according to the kind of the parameter, i.e., a period of time from when an event occurs to when the shooting condition changes due to the occurrence of the event, which depends on the parameter (step S11).

Next, the edition point information generation unit 22b instructs the image processing unit 11a to compulsorily create a VOB unit having, at its beginning, a picture corresponding to a shoot timing Tep which is by the delay time earlier than the shoot timing at which the parameter is detected. Then, the image processing unit 11a performs Trans-coding for compulsorily recreating the VOB unit (step S12b).

Thereafter, the edition point information generation unit 22b generates edition point information indicating the shoot timing Tep that is determined to be appropriate as an edition point, and generates edition point picture information indicating that an edition point is set at an I picture at the beginning of the VOB unit VOBU which is compulsorily created as shown in FIGS. 10(*b*)~10(*d*). Then, the play item of the AV stream is changed to show that the shoot timing Tep is set at the edition point (step S13).

Hereinafter, the Trans-coding process for compulsorily recreating a VOB unit VOBU will be described.

FIG. 10(*a*) shows one VOB unit VOBU(f) comprising plural pictures F1, F2, F3, F4, F5, F6, F7, F8, F9, F10, . . .

The picture F1 is an I picture which does not refer to another picture when it is coded or decoded, pictures F4, F7, and F10 are P picture which refer to a forward I picture or P picture when they are coded or decoded, and pictures F2, F3, F5, F6, F8, and F9 are B pictures which refer to a forward I picture or P picture and a backward P picture when they are coded or decoded. The respective pictures shown in FIG. 10(*a*) are in the original reference relationship which is defined by MPEG-2.

FIG. 10(*b*) shows the case where a picture to be an edition point is the fourth picture F4 in the VOB unit VOBU(f), and the picture type of this picture F4 is changed, and further, the reference relationship between forward two B pictures F2 and F3 is changed.

In this case, the picture F4 is changed from a P picture to an I picture, and the B pictures F2 and F3 are Trans-coded so as to refer to only the forward I picture F1. Further, a new VOB unit VOBU(fb1) having the picture F4 at its beginning is created, and the indexes of the picture F4 and the subsequent pictures are renumbered. A VOB unit VOBU(fa1) is a new VOB unit just before the VOB unit VOBU(fb1), in which the reference relationship between the B pictures F2 and F3 is changed.

FIG. 10(*c*) shows the case where a picture to be an edition point is the fifth picture F5 in the VOB unit VOBU(f), and the reference relationship between this picture F5 and the following B picture F6 is changed, and further, the picture type of the P picture F7 is changed.

In this case, the picture F7 is changed from a P picture to an I picture, and the pictures F5 and F6 are Trans-coded so as to refer to only the backward I picture F7 whose picture type is changed. Further, a new VOB unit VOBU(fb2) having the picture F5 at its beginning is created, and the indexes of the picture F8 and the subsequent pictures are renumbered. A VOB unit VOBU(fa2) is a new VOB unit just before the VOB unit VOBU(fb2), in which the picture F4 is the final picture.

FIG. 10(*d*) shows the case where a picture to be an edition point is the sixth picture F6 in the VOB unit VOBU(f), and the reference relationship of this picture F6 and the reference relationship between the B pictures F5 and F7 before and after the picture F6 are changed.

In this case, the picture F7 is changed from a P picture to an I picture, and the picture F5 is Trans-coded so as to refer to only the forward P picture F4 while the picture F6 is Trans-coded so as to refer to only the backward P picture F7. Further, a new VOB unit VOBU(fb3) having the picture F6 at its beginning is created, and the indexes of the picture F8 and the subsequent pictures are renumbered. A VOB unit VOBU (fa3) is a new VOB unit just before the VOB unit VOBU(fb3), in which the P picture F5 is the final picture.

As described above, the image pickup apparatus 102 according to the second embodiment is provided with the image processing unit 11*a* for extracting an image parameter indicating a feature of change in image from an image signal obtained by shooting an object; the audio processing unit 12*a* for extracting an audio parameter indicating a feature of change in audio from an audio signal obtained by shooting an object; and the specific ID information processing unit 10*a* for extracting a specific parameter indicating a feature of change in shooting condition, on the basis of information indicating physiological change of the operator; wherein the extracted parameter is compared with a predetermined decision threshold to determine whether a shoot timing at which the image or audio changes is appropriate as an edition point or not. Therefore, it is possible to generate an AV stream in which a shot part that seems to be important for the operator can be automatically edited, as in the first embodiment.

Further, in this second embodiment, the picture type of a picture at an edition point and the reference relationship of the neighboring pictures are changed by performing Trans-coding on these pictures so that a picture corresponding to a shoot timing which is determined to be appropriate as an edition point corresponds to a gap of VOB units. Therefore, even when the image signal obtained by shooting is coded, setting of an edition point can be accurately carried out.

Furthermore, in this second embodiment, an edition point is set at a shoot timing which is earlier than the shoot timing at which the shooting condition changes, by a delay time from when an event occurs to when the shooting condition changes due to the occurrence of the event. Therefore, it is possible to set the edition point approximately at the timing when the event actually occurs.

In this second embodiment, when the picture set to the edition point is an inter-frame predictive picture, this picture is Trans-coded into an intra-frame predictive picture and recorded. However, the intra-frame predictive picture obtained by the Trans-coding may be recorded separately from the inter-frame predictive picture that is set to the edition point, as its sub-picture.

In this case, during edition, the inter-frame predictive picture set to the edition point is replaced with the intra-frame predictive picture that is recorded as its sub-picture, and the intra-frame predictive picture can be utilized for playback as a head picture of the VOB unit as the edition point.

Embodiment 3

FIG. 11 is a diagram for explaining an image pickup apparatus according to a third embodiment of the present invention.

The image pickup apparatus 103 according to the third embodiment is provided with, instead of the edition point information generation unit 22*a* of the image pickup apparatus 101 of the first embodiment, an edition point information generation unit 22*c* which selects either a process of generating a new VOB unit VOBU in which a head picture corresponds to an edition point, and a process of setting an edition point to a gap of VOB units VOBU which is closest to this edition point, according to whether buffer data before coding exists or not when inserting an edition point. Further, a control unit 20*c* is different from the control unit 20*a* of the first embodiment only in that it controls the image processing unit 11*a* according to the selected process of setting an edition point. The other constituents of the image pickup apparatus 103 of the third embodiment are identical to those of the image pickup apparatus 101 of the first embodiment.

Next, the operation of the image pickup apparatus 103 will be described.

In the image pickup apparatus 103 of the third embodiment, the manual setting operation before shooting is carried out in the same manner as described for the first embodiment.

When shooting is started, like the image pickup apparatus 101 of the first embodiment, the image pickup apparatus 103 obtains image information, audio information, and information indicating shooting conditions, and determines whether a shoot timing at which the shooting condition of image or audio changes is appropriate as an edition point or not, on the basis of a parameter of user operation or physiological change of the operator, a parameter of image, and a parameter of audio, which are extracted from the obtained information.

In this third embodiment, every time a shoot timing at which the shooting condition changes is determined to be appropriate as an edition point by the parameter determination unit 21 on the basis of the parameters supplied from the respective processing units 10a, 11a, and 12a, the edition point information generation unit 22c generates edition point information indicating the shoot timing at which an edition point is set, thereby performing the edition point setting process.

Figure 12:
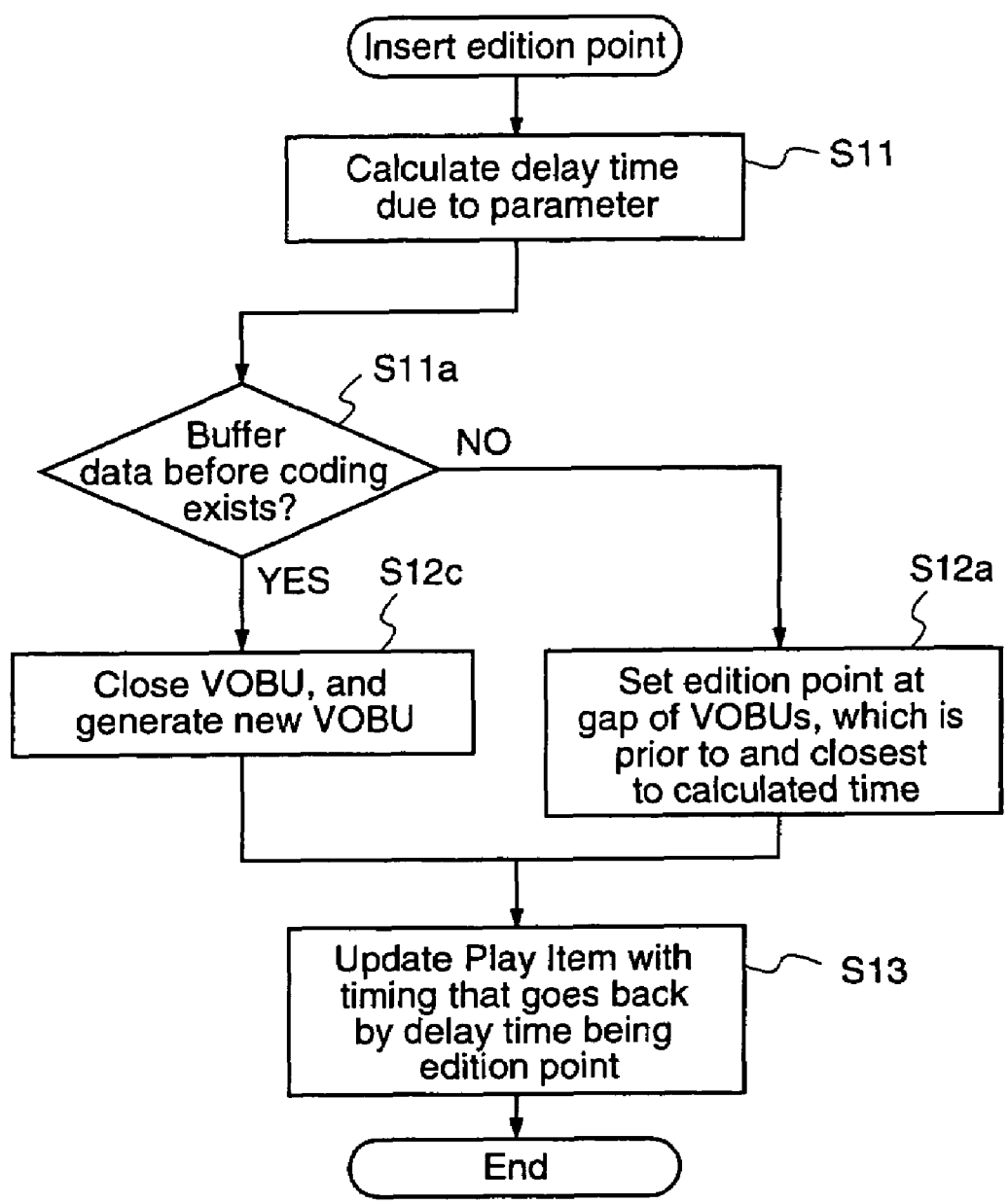
FIG. 12 is a flow chart for explaining a process of inserting edition points by the image pickup apparatus according to the third embodiment.

FIG. 12 shows a flow of the edition point setting process.

In this third embodiment, the control unit 20c calculates a delay type according to the type of the parameter, i.e., a period of time from when an even occurs to when the shooting condition changes due to the occurrence of the event, which varies depending on the parameter (step S11).

Next, the edition point information generation unit 22c determines whether or not there are buffer data as an image signal before coding, upon calculation of the delay time (step S11a). When it is determined that there are buffer data before coding, the VOB unit VOBU being created is closed, and a new VOB unit VOBU is created (step S12c). On the other hand, when it is determined that there are no buffer data before coding in step S11a, a gap between VOB units VOBU is set as an edition point, which gap is prior to a shoot timing Tep that is by the calculated delay time earlier than a shoot timing Tcp at which the shooting condition changes, and is closest to the shoot timing Tep (step S12a). The process in step S12a is identical to the process in step S12a of the first embodiment.

Thereafter, the edition point information generation unit 22c generates edition point information indicating the shoot timing Tep which is determined to be appropriate as an edition point, and changes the play item of the system stream so as to indicate that the edition point is set by either the process of step S12a or the process of step S12c (step S13).

Figure 13:
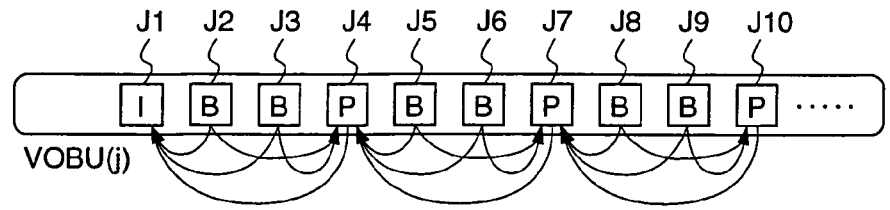
Figure 13:
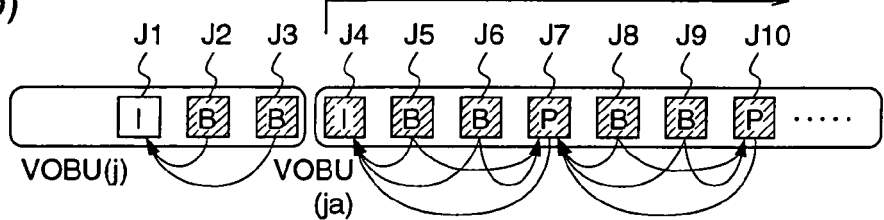
Figure 13:
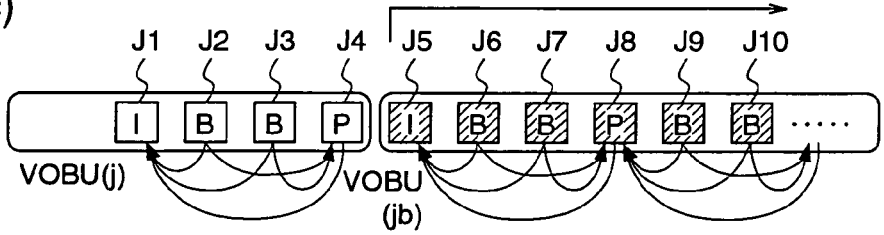
Figure 13:
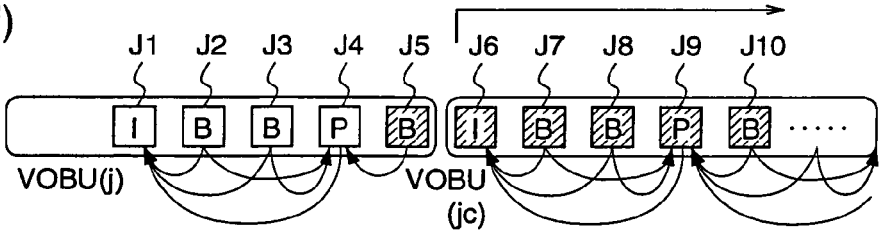

FIG. 13 is a diagram for explaining the process of creating a new VOB unit VOBU with a head picture being set to an edition point, in step S12c.

FIG. 13(a) shows one VOB unit VOBU(j) comprising plural pictures J1, J2, J3, J4, J5, J6, J7, J8, J9, J10, . . .

The picture J1 is an I picture which does not refer to another picture when it is coded or decoded, pictures J4, J7, and J10 are P picture which refer to a forward I picture or P picture when they are coded or decoded, and pictures J2, J3, J5, J6, J8, and J9 are B pictures which refer to a forward I picture or P picture and a backward P picture when they are coded or decoded. The respective pictures in the VOB unit VOBU(j) are in the original reference relationship which is defined by MPEG-2.

FIG. 13(b) shows the case where a new VOB unit VOBU is generated with the fourth picture J4 in the VOB unit VOBU(j) being an edition point.

In this case, the picture J4 which is to be coded as a P picture in the VOB unit VOBU(j) is coded as an I picture Ja1 at the beginning of a new VOB unit VOBU(ja). The second picture J2 and the third picture J3 as B pictures in the VOB unit VOBU(j) are coded as B pictures which refer to only the forward I picture J1. In the VOB unit VOBU(ja), pictures Ja4 and Ja7 are P pictures which refer to a forward I picture or P picture when being coded or decoded, and pictures Ja2, Ja3, Ja5, and Ja6 are B pictures which refer to a forward I picture or P picture and a backward P picture when being coded or decoded.

FIG. 13(c) shows the case where a new VOB unit VOB is generated with the fifth picture J5 in the VOB unit VOBU(j) being an edition point.

In this case, the picture J5 which is to be coded as a B picture in the VOB unit VOBU(j) is coded as an I picture at the beginning of a new VOB unit VOBU(jb). In the VOB unit VOBU(jb), a picture J8 is a P picture which refers to a forward I picture or P picture when being coded or decoded, and pictures J6, J7, J9, and J10 are B pictures which refer to a forward I picture or P picture and a backward P picture when being coded or decoded.

FIG. 13(d) shows the case where a new VOB unit VOBU is generated with the sixth picture J6 in the VOB unit VOBU(j) being an edition point.

In this case, the picture J6 which is to be coded as a B picture in the VOB unit VOBU(j) is coded as an I picture at the beginning of a new VOB unit VOBU(jc). The fifth picture J5 as a B picture in the VOB unit VOBU(j) is coded as a B picture which refers to only the forward P picture J4. In the VOB unit VOBU(jc), a picture J9 is a P picture which refers to a forward I picture or P picture when being coded or decoded, and pictures J7, J8, and J10 are B pictures which refer to a forward I picture or P picture and a backward P picture when being coded or decoded.

As described above, the image pickup apparatus 103 according to the third embodiment is provided with the image processing unit 11a for extracting an image parameter indicating a feature of change in image from an image signal obtained by shooting an object; the audio processing unit 12a for extracting an audio parameter indicating a feature of change in audio from an audio signal obtained by shooting an object; and the specific ID information processing unit 10a for extracting a specific parameter indicating a feature of change in shooting condition, on the basis of information indicating physiological change of the operator; wherein the extracted parameter is compared with a predetermined decision threshold to determine whether a shoot timing at which the parameter occurs is appropriate as an edition point or not. Therefore, it is possible to generate an AV stream in which a shot part that seems to be important for the operator can be automatically edited, as in the first embodiment.

Further, in this third embodiment, when inserting an edition point, either the process of generating a new VOB unit VOBU with a head picture being an edition point or the process of setting an edition point at a gap of VOB units VOBU which is closest to an event occurrence timing is selected depending on whether or not there are buffer data before coding. Therefore, when the image signal obtained by shooting is not coded, an edition point can be set in an accurate position by generating a VOB unit VOBU with reference to the edition point. On the other hand, when the image signal obtained by shooting is coded, setting of an edition point can be easily carried out without processing the AV stream.

Further, in this third embodiment, an edition point is set at a shoot timing which is earlier than the shoot timing at which the shooting condition changes, by a delay time from when an event occurs to when the event is detected, i.e., the shooting condition changes due to the occurrence of the event. Therefore, the edition point can be set approximately to the shoot timing at which the event actually occurs.

In this third embodiment, a shoot timing at which an edition point is set is determined according to the delay time from when an event occurs to when the image, audio, or shooting condition actually changes. However, an event might occur after the image, audio, or shooting condition changes. In this case, a shoot timing at which an edition point is set may be determined according to a time from when the image, audio, or shooting condition changes to when an event occurs.

Further, in this third embodiment, when the image signal obtained by shooting is coded, an edition point is set at a gap between VOB units VOBU, which is closest to the timing at which an event occurs. In this case, Trans-coding of pictures may be carried out such that a picture corresponding to the shoot timing which is determined to be appropriate as an edition point comes to a gap of VOB units, and the picture type thereof and the reference relationship of the neighboring pictures are changed.

Figure 14:
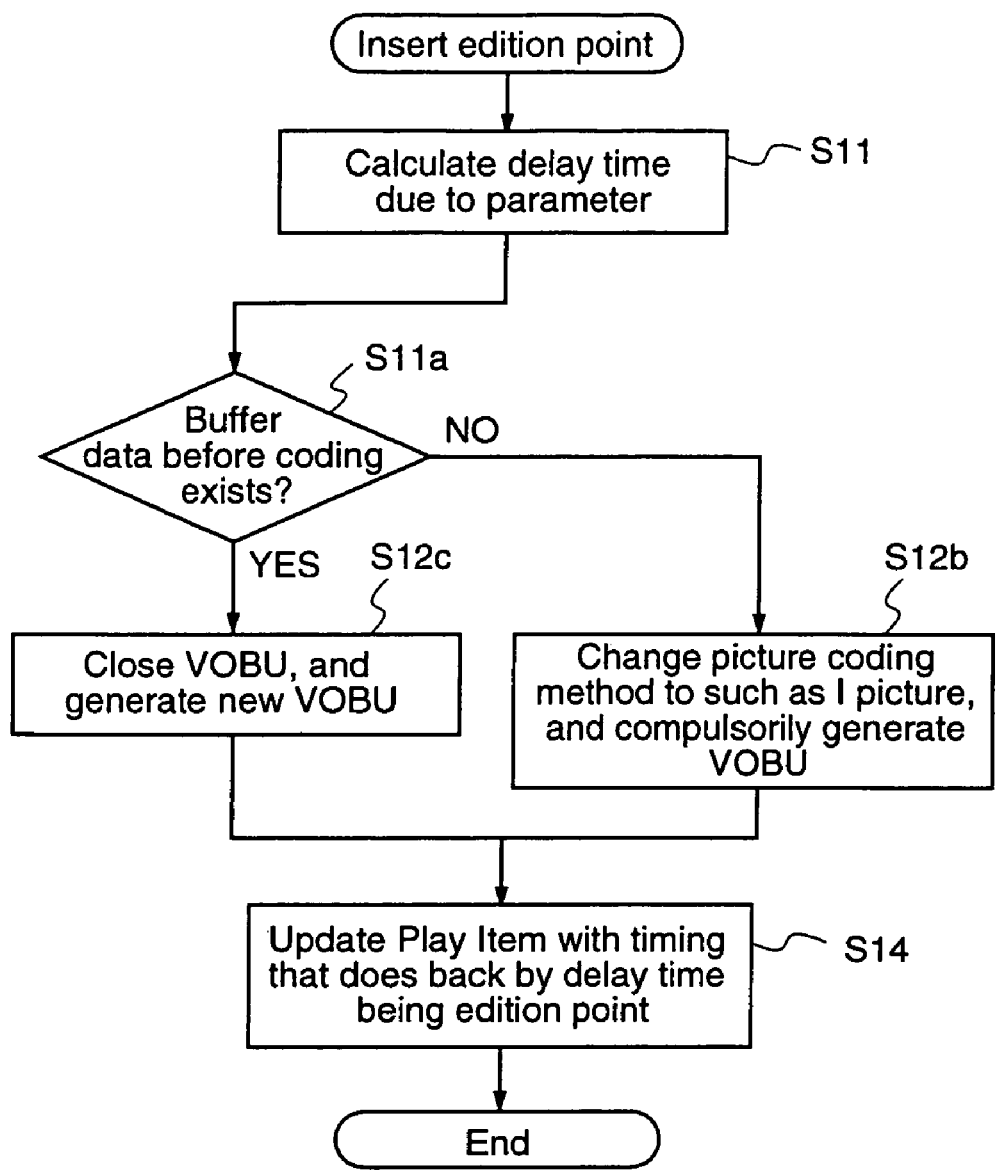
FIG. 14 is a diagram illustrating a modification of the edition point insertion process flow by the image pickup apparatus according to the third embodiment.

In this case, as shown in FIG. 14, when setting an edition point, switching is carried out between the process of generating a new VOB unit VOBU with a head picture being an edition point (step S12c) and the process of Trans-coding these pictures such that the picture corresponding to the shoot timing which is determined to be appropriate as an edition point comes to a gap of VOB units, and the picture type thereof and the reference relationship of the neighboring pictures are changed (step S12b), according to the result of the determination (step S11a) as to whether there are buffer data before coding or not.

Furthermore, when the image signal obtained by shooting is coded, switching is carried out between the process of setting an edition point to a gap between VOB units VOBU, which is closest to the event occurrence timing, and the process of compulsorily generating a VOB unit VOBU by Trans-coding, according to whether the time required for the Trans-coding exceeds a remaining time that can be used for the coding process in the image processing unit.

Figure 15:
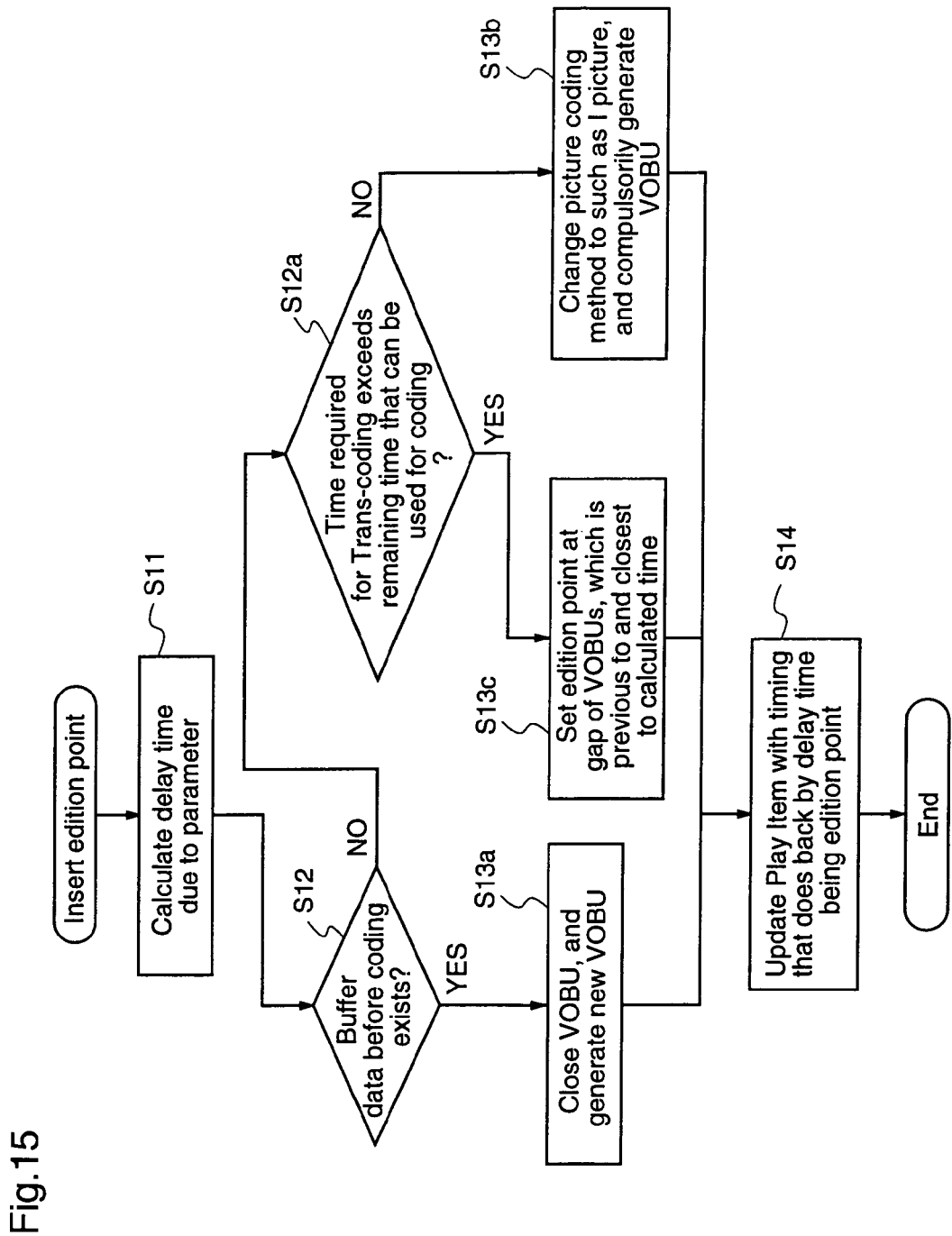
FIG. 15 is a diagram illustrating another modification of the edition point insertion process flow by the image pickup apparatus according to the third embodiment.

FIG. 15 is a flow of switching the edition point setting process according to the remaining time that can be used for coding, when there are no buffer data before coding.

In this case, when inserting an edition point, it is determined whether there are buffer data before coding or not (step S12), and a new VOB unit VOBU with a head picture being an edition point is compulsorily generated when it is determined that there are buffer data (step S13a), as in the third embodiment.

On the other hand, when it is determined that there are no buffer data before coding, it is checked whether or not the time required for Trans-coding exceeds the remaining time that can be used for coding in the image processing unit 11a at the point in time (step S12a). When it is determined that the time required for Trans-coding exceeds the remaining time that can be used for coding at the point in time, an edition point is set at a gap of VOB units, which gas is closest to an even occurrence timing (step S13c). On the other hand, when it is determined in step S12a that the time required for Trans-coding does not exceed the remaining time that can be used for coding at the point in time, Trans-coding is carried out for compulsorily generating a VOB unit in which a picture corresponding to the event occurrence timing is placed at the beginning thereof (step S13b). In the process flow shown in FIG. 15, when there are no buffer data before coding, either the process in step S13b or the process in step S13c is selected according to the result of comparison between the time required for Trans-coding and the remaining time that can be used for coding in the image processing unit. However, when there are no buffer data before coding, one of the processes in step S13b and step S13c, which is previously set by the operator, may be carried out.

Further, while in the respective embodiments described above the AV stream is assumed to be a system stream based on MPEG-2, the AV stream may be a system stream based on MPEG-4 or MPEG-4 AVC.

However, in a system stream based on MPEG-4 AVC, there are two types of I pictures, i.e., I pictures that are not random-accessible and I pictures that are random-accessible, and an I picture to be set as an edition point should be a random-accessible I picture (IDR) which is closest to an event occurrence timing.

Further, in the system stream based on MPEG-4 AVC, an auxiliary information writing area (SEI) is set, and information indicating what factor causes an occurrence of a parameter may be embedded in this writing area.

Further, in the respective embodiments mentioned above, the AV stream includes data of pictures corresponding to one sequence. However, in addition to the data of pictures corresponding to the one sequence, data of sub-pictures outside a sequence for thumbnail edition and selection may be embedded in the AV stream. In this case, during edition, pictures appropriate as edition points can be recognized at one view by displaying thumbnails.

Further, in the respective embodiments mentioned above, all the pictures that are set as edition points are used for edition. However, it can be thought that many edition points make the edition work difficult, and therefore, the edition points may be thinned for each edition point setting factor, i.e., for change in the image or change in the audio. For example, edition points which are set by audio change are deleted from a plurality of set edition points, thereby reducing data of edition points to be utilized for edition.

Further, in the system stream based on MPEG-4 AVC, since the random accessible I pictures (IDR) are arranged at larger intervals than the random inaccessible I pictures, the number of edition points can be reduced by setting the I pictures (IDR) as edition points.

Furthermore, in the respective embodiments mentioned above, it is determined whether the parameter at occurrence of an event is larger than a predetermined decision threshold or not, thereby to set the event occurrence timing as an edition point. However, all the event occurrence timings may be set as edition points, and whether the edition points are actually utilized or not may be determined when edition is carried out.

The image pickup apparatus of the above-mentioned construction can be realized as follows. That is, the information generation unit of any of the image pickup apparatuses according to the first to third embodiments is constituted so as to generate edition point information indicating, as an edition point, a shoot timing at which the image, audio, or shooting condition changes, and further, the parameter determination unit is constituted so as to check the image parameter, the audio parameter, or the specific parameter when editing the AV stream to determine whether the shoot timing which is indicated as an edition point by the edition point information is to be used for edition or not.

In this case, specifically, the times at which all the events that change the image, audio, and shooting condition are embedded in the AV stream as edition point information indicating the shoot timings as edition points. Therefore, when setting the event occurrence timings as edition points, it becomes unnecessary to perform, in real time, the determination as to whether the event occurrence timings are to be utilized as edition points or not.

Furthermore, the respective embodiments mentioned above provide the image pickup apparatuses in which an edition point is set at not only a shoot timing at which image or audio of an object changes but also a shoot timing at which the physiological phenomenon of the operator changes or a shoot timing at which the operator operates the image pickup unit. However, an edition point may be set at only a shoot timing in which image or audio of an object changes. In this case, the image pickup apparatus does not include the specific ID information acquisition unit 10 and the specific ID information processing unit 10a.

Furthermore, although it is not described in the above-mentioned embodiments, the function units except for the image pickup unit 11, the recording medium 30a, and the recording medium interface 30 in the image pickup apparatus 101 of the first embodiment shown in FIG. 1, the image pickup apparatus 102 of the second embodiment shown in FIG. 8, and the image pickup apparatus 103 of the third embodiment shown in FIG. 11 are typically realized as an LSI which is an integrated circuit. Each of these function units may be individually packaged into a chip, or some of them or all of them may be packaged into a chip.

For example, the plural function units in the image pickup apparatus according to any of the above-mentioned embodiments except for a memory corresponding to the recording medium 30a and the recording medium interface 30 may be packaged into one chip.

Further, while in the present invention an integrated circuit called an LSI is described as an example, the integrated circuit can be called an IC, a system LSI, a super LSI, or an ultra LSI, depending on the integration degree.

Further, the manner of integration is not restricted to that one or plural function units is/are realized as an LSI. The one or plural function units may be realized by an exclusive circuit or a versatile processor. Further, as an LSI, there can be utilized a FPGA (Field Programmable Gate Array) which is able to perform programming after fabrication thereof, or a reconfigurable processor which is able to reconfigurate connection and setting of circuit cells in an LSI.

Moreover, if an integration circuit technology instead of LSI comes in, with a progress in semiconductor technology or another technology derived from semiconductor technology, it is a matter of course that the function units can be integrated utilizing the technology. For example, there is a possibility that the integration circuit technology in the future might adopt biotechnology.

Further, in recent years, a digital camera and a mobile terminal which can shoot an object and store a moving image thereof has been developed. When the respective function units constituting the image pickup apparatuses according to the first to third embodiments are mounted on these devices, it is possible to realize a digital camera and a mobile terminal which can record an AV stream in which a shot part that seems to be important for the operator can be edited automatically or by a simple selecting operation according to a guidance, and can reproduce a desired part of the stream while automatically editing the same.

APPLICABILITY IN INDUSTRY

An image pickup apparatus of the present invention generates an AV stream in which a shot part that seems to be important for the operator can be edited automatically or by a simple selecting operation according to a guidance, and particularly, it is useful for a home digital video camera, a digital camera, and a mobile terminal.

What is claimed is:

1. An image pickup apparatus for obtaining image information and audio information by shooting an object, and recording an audio visual (AV) stream including the image information and the audio information, said apparatus comprising:

an image pickup unit for shooting an object to output an image signal;

an image processing unit for subjecting the image signal obtained by shooting the object to signal processing, and extracting image information including an image parameter that indicates a feature of a change in the image;

an audio acquisition unit for obtaining audio to output an audio signal;

an audio processing unit for subjecting the audio signal to signal processing, and extracting audio information including an audio parameter that indicates a feature of a change in the audio;

a parameter determination unit for checking the image parameter or the audio parameter to determine whether a shoot timing at which the image or the audio changes is appropriate as an edition point or not; and an information generation unit for generating edition point information indicating a shoot timing which is determined to be appropriate as an edition point;

wherein an audio video stream including the image information, the audio information, and the edition point information is stored in a recording medium, wherein said information generation unit checks whether buffer data as image information before coding are stored in the image processing unit or not, sets the edition point to a picture corresponding to a shoot timing at which the image, audio, or shooting condition changes, when the buffer data before coding are stored, and sets the edition point to a head picture of a VOB unit as a unit of random access, which is closest to a shoot timing at which the image or audio changes, in a stream obtained by coding the image signal with the image processing unit, when the buffer data before coding are not stored, and wherein said image processing unit generates a VOB unit so that the picture corresponding to the edition point becomes a head picture of the VOB unit, when buffer data before coding are stored in the image processing unit.

2. An image pickup apparatus as defined in claim 1, further including:

a specific ID information acquisition unit for obtaining specific ID information indicating a shooting condition; and a specific ID information processing unit for subjecting the obtained specific ID information to signal processing, and extracting a specific parameter that indicates a feature of a change in the shooting condition;

wherein said parameter determination unit checks the specific parameter as well as the image parameter or the audio parameter to determine whether a shoot timing at which the image, audio, or shooting condition changes is appropriate as an edition point or not.

3. An image pickup apparatus as defined in claim 2, wherein said specific parameter shows the magnitude of a physiological change of an operator that occurs during shooting, or the magnitude of adjustment by operation of the operator.

4. An image pickup apparatus as defined in claim 3, wherein the physiological change of the operator that occurs during shooting is at least one of a change in perspiration of the operator, a change in α wave of the operator, a change in the number of blinks of the operator, a change in a pupil of the operator, and a change in pulse of the operator; and the specific ID information acquisition unit includes a sensor according to the type of the physiological change, for measuring the physiological change of the operator.

5. An image pickup apparatus as defined in claim 1, wherein
said image processing unit subjects the image signal obtained by shooting the object to an inter-frame predictive coding process for predictively coding a target picture to be coded, with reference to an already coded picture, and extracts the image parameter on the basis of a motion vector indicating the magnitude of motion of the image, the motion vector being used in the inter-frame predictive coding process;
said audio processing unit subjects the audio signal to a coding process corresponding to the coding process for the image signal; and
said information generation unit sets a specific picture included in an image stream obtained by coding the image signal, at the edition point, on the basis of the shoot timing that is determined to be appropriate as an edition point.

6. An image pickup apparatus as defined in claim 1, wherein said audio processing unit extracts the audio parameter on the basis of the magnitude of a change in the audio signal.

7. An image pickup apparatus as defined in claim 2, further including:
a control unit for setting threshold levels for the image parameter or the audio parameter, and the specific parameter, respectively, on the basis of a user's manual operation signal;
wherein said parameter determination unit checks the respective parameters on the basis of the corresponding threshold levels which are set by the control unit to determine whether a shoot timing at which the image, audio, or shooting condition changes is appropriate as an edition point or not.

8. An image pickup apparatus as defined in claim 2, further including:
a control unit having table information indicating correspondence between each one of plural scenarios, and combinations of the threshold levels for the image parameter or the audio parameter and the specific parameter, and setting the threshold levels of the respective parameters on the basis of a scenario designated by a user's manual operation, and the table information;
wherein said parameter determination unit checks the respective parameters on the basis of the corresponding threshold levels which are set by the control unit to determine whether a shoot timing at which the image, audio, or shooting condition changes is appropriate as an edition point or not.

9. An image pickup apparatus as defined in claim 8, wherein said table information is downloaded from an information terminal on a network.

10. An image pickup apparatus as defined in claim 1, wherein said information generation unit sets a picture to be used as an edition point, to a head picture of a VOB unit as a unit of random access, which is closest to a shoot timing at which the image or audio changes, in an image stream obtained by coding the image signal.

11. An image pickup apparatus as defined in claim 10, wherein said information generation unit sets the edition point to a shoot timing according to a delay time from when an event that changes the image or audio occurs to when the image or audio actually changes.

12. An image pickup apparatus as defined in claim 1, wherein said image processing unit performs, according to an instruction from the information generation unit, Trans-coding on the image stream obtained by coding the image signal so that the picture corresponding to the edition point becomes an I picture position at the beginning of a VOB unit.

13. An image pickup apparatus as defined in claim 12, wherein said information generation unit sets the edition point to a shoot timing according to a delay time from when an event that changes the image or audio occurs to when the image or audio actually changes.

14. An image pickup apparatus for obtaining image information and audio information by shooting an object, and recording an audio visual (AV) stream including the image information and the audio information, said apparatus comprising:
an image pickup unit for shooting an object to output an image signal;
an image processing unit for subjecting the image signal obtained by shooting the object to signal processing, and extracting image information including an image parameter that indicates a feature of a change in the image;
an audio acquisition unit for obtaining audio to output an audio signal;
an audio processing unit for subjecting the audio signal to signal processing, and extracting audio information including an audio parameter that indicates a feature of a change in the audio;
a parameter determination unit for checking the image parameter or the audio parameter to determine whether a shoot timing at which the image or the audio changes is appropriate as an edition point or not; and
an information generation unit for generating edition point information indicating a shoot timing which is determined to be appropriate as an edition point,
wherein an audio video stream including the image information, the audio information, and the edition point information is stored in a recording medium,
wherein said information generation unit
checks whether buffer data as image information before coding are stored in the image processing unit or not,
sets the edition point to a picture corresponding to a shoot timing at which the image, audio, or shooting condition changes, when the buffer data before coding are stored,
compares the remaining time which can be used for coding in the image processing unit with the time required for Trans-coding, when buffer data before coding are not stored,
sets the edition point to a head picture of a VOB unit as a unit of random access, which is closest to a shoot timing at which the image or audio changes, in an image stream obtained by coding the image signal with the image processing unit, when the time required for Trans-coding exceeds the remaining time which can be used for coding in the image processing unit, and
instructs the image processing unit to perform Trans-coding of the image stream, when the time required for Trans-coding does not exceed the remaining time which can be used for coding in the image processing unit, and
wherein said image processing unit generates a VOB unit so that the picture corresponding to the edition point becomes a head picture of the VOB unit, when buffer data before coding are stored, and performs Trans-coding on the image stream obtained by coding the image signal so that the picture corresponding to the edition point becomes an I picture positioned at the beginning of a VOB unit, when buffer data before coding are not stored and the time required for Trans-coding does not exceed the remaining time which can be used for coding in the image processing unit.

15. An image pickup apparatus as defined in claim 1, wherein the time at which an even that changes the image or audio occurs is recorded as the edition point in the audio video stream.

16. An image pickup apparatus as defined in claim 15, wherein the time at which the event occurs is recorded as a play list indicating playback conditions in the audio visual stream.

17. An image pickup apparatus as defined in claim 15, wherein information indicating which factor between image and audio causes the edition point is embedded in the audio visual stream.

18. An image pickup apparatus as defined in claim 1, wherein said information generation unit embeds a picture corresponding to the time at which an event that changes the image or audio occurs, as an out-of-sequence picture to be used for thumbnail display during edition, in the audio visual stream.

19. An image pickup method for obtaining image information and audio information by shooting an object, and recording an audio visual stream including the image information and the audio information, said method comprising:

an image pickup step of shooting an object to output an image signal;

an image processing step of subjecting, using an image processing unit, the image signal obtained by shooting the object to signal processing, and extracting image information including an image parameter that indicates a feature of a change in the image;

an audio acquisition step of obtaining audio to output an audio signal;

an audio processing step of subjecting the audio signal to signal processing, and extracting audio information including and audio parameter that indicates a feature of a change in the audio;

a parameter determination step of checking the image parameter or the audio parameter to determine whether a shoot timing at which the image or the audio changes is appropriate as an edition point or not;

an information generation step of generating edition point information indicating a shoot timing which is determined to be appropriate as an edition point; and a step of storing an audio video stream including the image information, the audio information, and the edition point information into a recording medium, wherein said information generation step comprises:
checking whether buffer data as image information before coding are stored in the image processing unit or not;

setting the edition point to a picture corresponding to a shoot timing at which the image, audio, or shooting condition changes, when the buffer data before coding are stored; and setting the edition point to a head picture of a VOB unit as a unit of random access, which is closest to a shoot timing at which the image or audio changes, in a stream obtained by coding the image signal with the image processing unit, when the buffer data before coding are not stored, and wherein said image processing step comprises generating a VOB unit so that the picture corresponding to the edition point becomes a head picture of the VOB unit, when buffer data before coding are stored in the image processing unit.

20. A semiconductor device for obtaining image information and audio information by shooting an object, and recording an audio visual stream including the image information and the audio information, said device comprising:

an image processing unit for subjecting an image signal obtained by shooting an object to signal processing, and extracting image information including an image parameter that indicates a feature of a change in the image;

an audio acquisition unit for obtaining audio to output an audio signal;

an audio processing unit for subjecting the audio signal to signal processing, and extracting audio information including an audio parameter that indicates a feature of a change in the audio;

a parameter determination unit for checking the image parameter or the audio parameter to determine whether a shoot timing at which the image or audio changes is appropriate as an edition point or not; and an information generation unit for generating edition point information indicating a shoot timing which is determined to be appropriate as an edition point;

wherein an audio video stream including the image information, the audio information, and the edition point information is stored in a recording medium, wherein said information generation unit
checks whether buffer data as image information before coding are stored in the image processing unit or not, sets the edition point to a picture corresponding to a shoot timing at which the image, audio, or shooting condition changes, when the buffer data before coding are stored, and sets the edition point to a head picture of a VOB unit as a unit of random access, which is closest to a shoot timing at which the image or audio changes, in a stream obtained by coding the image signal with the image processing unit, when the buffer data before coding are not stored, and wherein said image processing unit generates a VOB unit so that the picture corresponding to the edition point becomes a head picture of the VOB unit, when buffer data before coding are stored in the image processing unit.

* * * * *

UNITED STATES PATENT AND TRADEMARK OFFICE
CERTIFICATE OF CORRECTION

PATENT NO. : 7,586,517 B2
APPLICATION NO. : 11/259208
DATED : September 8, 2009
INVENTOR(S) : Masayasu Iguchi et al.

It is certified that error appears in the above-identified patent and that said Letters Patent is hereby corrected as shown below:

In column 31, claim 15, line 14, "which an even that" should read --which an event that--.

Signed and Sealed this
Twenty-fifth Day of September, 2012

David J. Kappos
*Director of the United States Patent and Trademark Office*